"(12) United States Patent
Higaki

(10) Patent No.: US 7,840,036 B2
(45) Date of Patent: Nov. 23, 2010

(54) HUMAN BEING DETECTION APPARATUS, METHOD OF DETECTING HUMAN BEING, AND HUMAN BEING DETECTING PROGRAM

(75) Inventor: Nobuo Higaki, Saitama (JP)

(73) Assignee: Honda Motor Co., Ltd., Minato-Ku, Tokyo (JP)

( * ) Notice: Subject to any disclaimer, the term of this patent is extended or adjusted under 35 U.S.C. 154(b) by 1021 days.

(21) Appl. No.: 11/634,315

(22) Filed: Dec. 6, 2006

(65) Prior Publication Data
US 2007/0165931 A1 Jul. 19, 2007

(30) Foreign Application Priority Data
Dec. 7, 2005 (JP) ............... 2005-352890

(51) Int. Cl.
G06K 9/00 (2006.01)
(52) U.S. Cl. ..................................... 382/118
(58) Field of Classification Search ................ 382/118, 382/209, 218, 154, 47–48
See application file for complete search history.

(56) References Cited
U.S. PATENT DOCUMENTS
5,987,154 A * 11/1999 Gibbon et al. .............. 382/115
6,184,926 B1 * 2/2001 Khosravi et al. ............ 348/239
6,922,478 B1 * 7/2005 Konen et al. ................ 382/115
7,321,668 B2 * 1/2008 Horie et al. ................. 382/103
2004/0096085 A1 * 5/2004 Matsumoto et al. ......... 382/107
2005/0196015 A1 * 9/2005 Luo et al. ................... 382/103
2006/0140445 A1 * 6/2006 Cusack ....................... 382/103

FOREIGN PATENT DOCUMENTS
| JP | 2000-222576 A | 8/2000 |
| JP | 2003-108980 A | 4/2003 |
| JP | 2004-171189 A | 6/2004 |
| JP | 2005-071344 A | 3/2005 |
| JP | 2005-128815 | 5/2005 |

* cited by examiner

Primary Examiner—Daniel G Mariam
(74) Attorney, Agent, or Firm—Squire, Sanders & Dempsey, LLP

(57) ABSTRACT

A human being detection apparatus includes a moving object detecting part for detecting a target region from the picture image as a region of the moving object and a target distance as a distance to the moving object, a head region setting part for setting the head region corresponding to the target distance, a sample storing image part for storing a sample image having a predetermined size corresponding to the head region of the human being, and a human being determining part for determining whether or not the moving object is a human being by comparing the head region in the picture image converted to have a predetermined size with the sample image.

8 Claims, 20 Drawing Sheets

SAMPLE IMAGES

RELATION BETWEEN PARALLAX AND MOTION AMOUNT

TARGET DISTANCE DETERMINATION

TARGET DISTANCE IMAGE TD

IN CASE OF TILT ANGEL = 0°

TARGET DISTANCE IMAGE

IN CASE OF TILT ANGEL ≠ 0°

TARGET DISTANCE IMAGE

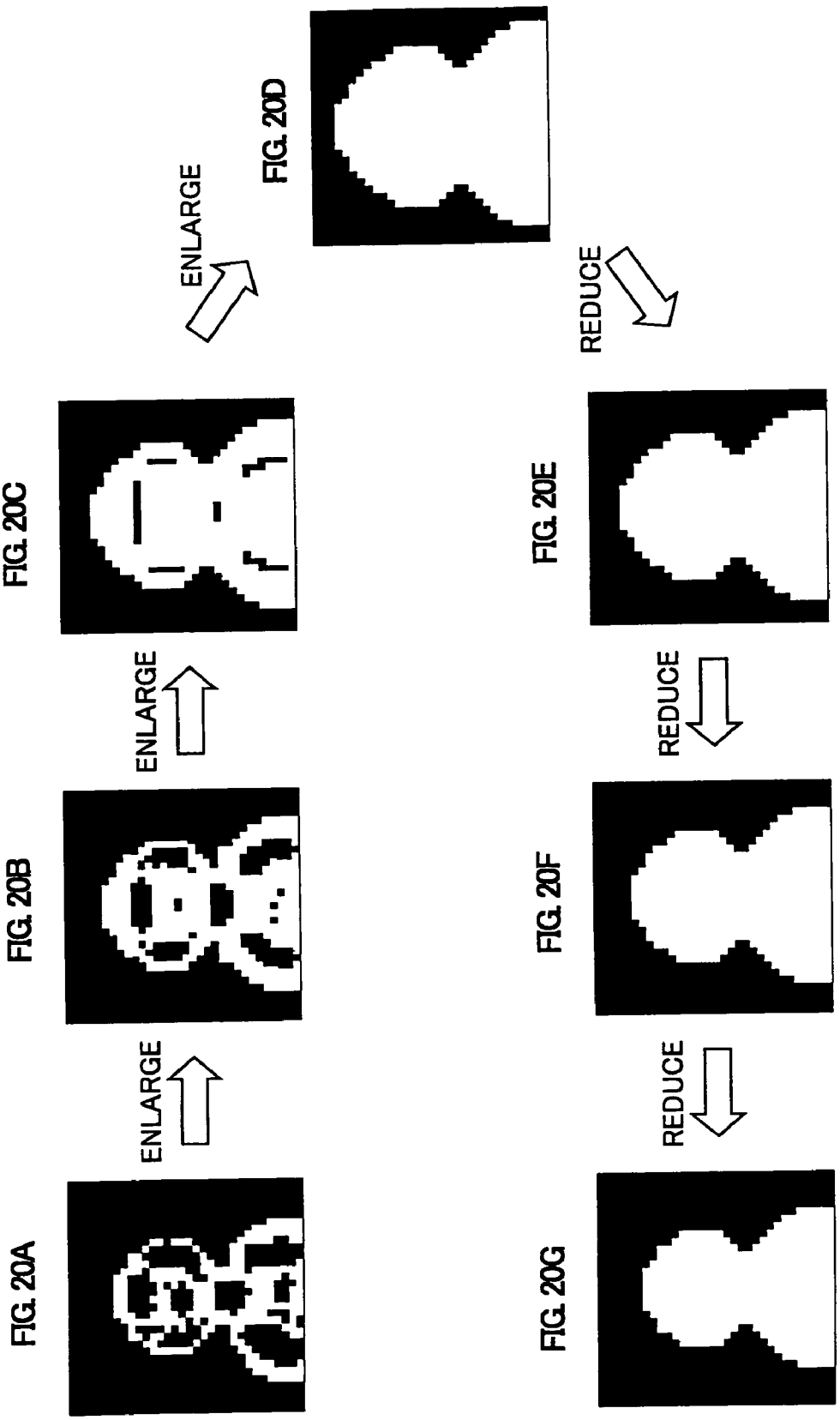

FIG.21A ORIGINAL IMAGE
FIG.21B NORMALIZED IMAGE (HEAD EDGE IMAGE)
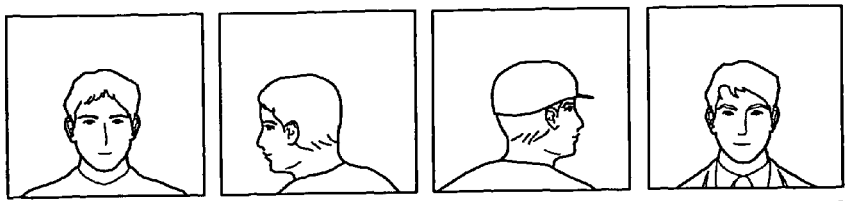
FIG.21C COMPLEMENTED IMAGE
| FIG.21D SIMILARITY | 0.885742 | 0.903320 | 0.866211 | 0.833008 |
|---|---|---|---|---|
| FIG.21E DISTANCE [m] | 1.813914 | 2.653852 | 3.002326 | 3.617000 |

HUMAN BEING DETECTION APPARATUS, METHOD OF DETECTING HUMAN BEING, AND HUMAN BEING DETECTING PROGRAM

FIELD OF THE INVENTION

The present invention relates to a human being detection apparatus, a method of detecting a human being, and a human being detecting program and particularly to a human being detection apparatus from a picture image shot by a camera, a method of detecting a human being from a picture image shot by a camera, and a human being detecting program for detecting a human being from a picture image shot by a camera.

DESCRIPTION OF THE RELATED ART

As a method of detecting a human in a picture image shot by a camera such as a CCD camera, a background subtraction method is known in which a differential image is generated with the background removed by obtaining a difference, whenever a picture image (a frame image) is sequentially entered, to detect a region of a moving object of a foreground as the human being. Japanese Laid-open Patent Application Publication No. 2005-128815 discloses this technology at paragraphs 0037~0048, and FIGS. 1 and 2.

Japanese Laid-open Patent Application Publication No. 2005-128815 discloses as follows:

In consideration of possibility in that a region of a foreground is an object other than a human being, a determination as to whether the region is one indicating the human being is made by comparing a physical characteristic amount such as an aspect ratio, an area ratio, or the like of the region with a physical characteristic amount of the human being previously stored.

Further, in this prior art (Japanese Laid-open Patent Application Publication No. 2005-128815), the human being is also detected by a pattern recognition using an edge pattern.

In this prior art, the number of times of tracking is differently set between a case in which a foreground is determined as the human being using the physical characteristic amount and a case in which the human being is determined by the pattern recognition. When the traced region is determined as the human being the set number of times, the region is determined as one indicating the human being. As described above, in this prior art, an accuracy in determining a moving object in the picture image as the human being is improved by performing the judgment according to both of the physical characteristic amount and the judgment according to the pattern recognition.

Further, in the general background subtraction method, in a case that a camera moves itself, a moving object (human being) is detected by obtaining a difference after a position adjustment of the backgrounds for each frame image sequentially entered.

The above-described prior art (Japanese Laid-open Patent Application Publication No. 2005-128815) presumes that the whole body of the human being is shot because the method of detecting the human being depending on the physical characteristic amount uses the aspect ratio, the area ratio of the region, and the like as physical characteristic amounts. Thus, in the prior art, for example, under a circumstance such as inside of an office where a part of the human being may be hided by a desk or the like, the human being cannot be detected.

Further the method of detecting the human being by the pattern recognition presumes that the pattern previously stored has substantially the same size as the pattern of the moving object in the image. Thus, under the above-described miscellaneous circumstances, in a situation in which the human being is excessively remote from or near the camera, when the region of the human being is smaller or larger than the predetermined pattern in the image, the human being cannot be detected.

Further, in general background subtraction methods, when a frame image is entered at a predetermined interval from the camera, even if the position adjustment for the background cannot be correctly carried out, the subtraction is performed to surely detect the moving object from fewer frame images. Thus, even if the object is actually motionless, the object may be erroneously detected as a moving object (a human being).

SUMMARY OF THE INVENTION

It is an object of the present invention to provide a human being detection apparatus.

It is an object of the present invention to provide a method of detecting a human being.

It is an object of the present invention to provide a human being detecting program.

A first aspect of the present invention provides a human being detection apparatus for detecting a human being in a plurality of picture images including a moving object shot by a plurality of cameras, comprising: a moving object detecting part that detects a target region of the moving object in the picture images and a target distance to the moving object from the camera as moving object information on the basis of parallaxes in picture images and a difference between picture images sequentially entered; a head region setting part that sets a head region as having a predetermined size corresponding to the target distance in the target region detected by the moving object detecting part when it is assumed that the moving object is the human being; a sample image storing part for storing a sample image having a predetermined size corresponding to the head region of the human being; and a human being determining part that determines whether the moving object is the human being by converting the head region, set by the head region setting part, in the picture image into an image having the predetermined size and comparing the converted head region with the sample image to determine that the moving object is the human being.

According to this configuration, preferably, the human being detection apparatus calculates the target distance of the moving object to the moving object from the parallax in a plurality of picture images to detect a motion of the moving object from the difference in the picture images sequentially entered. This can detect the region of the moving object (target region) and the distance to the moving object (target distance).

Further, preferably, the human being detection apparatus sets the head region with assumption that the moving object is a human being. In this event, because the target distance is known, a size of the head region can be set to have a size corresponding to the target distance.

Further, the human being detection apparatus can compare the head region in the picture image with the sample image stored in the sample image storing part after converting the head region to have the same size as the sample image stored in the sample image storing part to determine that the moving object is a human being. Thus, the size of the head region varying in accordance with the target distance can be compared with the sample image on the same basis after conversion for obtaining a reference size of the object.

A second aspect of the present invention provides the human being detection apparatus based on the first aspect, wherein the sample image is an image indicating a shape of the head region, and the human being determining part includes: a head edge image generating part that generates a head edge image as an edge image corresponding to the head region set by the head region setting part; a size normalizing part that converts the head edge image generated by the head edge image generating part into a normalized image having the predetermined size; a complementing part that generates a complemented image in which gaps in the normalized image converted by the size normalizing part are filled; and similarity determining part that determines that the moving object is the human being on the basis of a similarity between the complemented image and the sample image.

According to this configuration, in the human being detection apparatus, preferably, the head edge image generating part generates the head edge image corresponding to the head region, and the size normalizing part converts the head edge image into the normalized image having a predetermined size. Further, in the human being detection apparatus, preferably, the complementing part generates a complemented image in which gaps in the normalized image are filled. Thus, the human being detection apparatus can compare the complemented image with the sample image regarding the shape of the head region.

Further, in the human being detection apparatus, preferably, the similarity determining part determines whether the moving object is a human being by calculating a similarity between the complemented image and the sample image.

A third aspect of the present invention provides the human being detection apparatus, based on the first aspect, further comprising an image shifting part that adjusts a reference position of the complemented image to a predetermined reference position of the sample image.

According to this configuration, in the human being detection apparatus, preferably, the image shifting part shifts the complemented image vertically and horizontally to adjust a reference position of the complemented image to the reference position of the sample image. The reference position is, for example, a gravity point of the image. Further, if the complemented image is shifted vertically, the reference position may be an upper end of the head.

A fourth aspect of the present invention provides the human being detection apparatus based on the second aspect, wherein the complementing part fills gaps in the head edge image by enlarging and reducing for a region of the head edge image generated by the head edge image generating part a plurality of times, respectively.

According to this configuration, in the human being detection apparatus, preferably, the complementing part fills gaps in the head region by enlarging the region of the head image a plurality of times. Further because the head region becomes larger than that of the actual head region by enlarging, preferably, reduction is performed the same number of times. In this event, because the enlarged image is fully filled, the reduction generates no gaps. Thus, the complementing part can generate the image with the original size of the head region without the gaps.

A fifth aspect of the present invention provides the human being detection apparatus based on the first aspect, wherein the sample image storing part stores a plurality of sample images of a sample human being in which a direction of the sample human being varies from one of the sample image to another one of the sample images.

According to this configuration, in the human being detection apparatus, preferably, the sample image storing part stores the sample images in which the human being faces in different directions to surely determine the human being even if the human being detected as the moving object turns to different directions such as the direction to the camera, and a right direction.

A sixth aspect of the present invention provides the human being detection apparatus based on the first aspect, wherein the moving object detecting part outputs the moving object information when the target distance is within a predetermined range which is previously determined in accordance with a measured accuracy in determining the human being by the human being determining part.

According to this configuration, in the human being detection apparatus, preferably, the moving object detecting part, capable of detecting a distance to the moving object as the target distance, outputs moving object information only when the distance is within the predetermined range. The predetermined range is determined to be a range having a sufficient accuracy in detecting a human being by the human being detection apparatus and thus, previously determined from a measurement result.

A seventh aspect of the present invention provides a method of detecting a human being included in a plurality of picture images including a moving object shot by a plurality of cameras, comprising the steps of: detecting a target region of the moving object in the picture images and a target distance to the moving object from the camera as moving object information on the basis of parallaxes in picture images and a difference between picture images sequentially entered; setting a head region as having a predetermined size corresponding to the target distance in the target region when it is assumed that the moving object is the human being; generating a head edge image as an edge image corresponding to the head region; converting the head edge image into a normalized image having the predetermined size; generating a complemented image in which gaps in the normalized image converted by the size normalizing part are filled; calculating a similarity between the complemented image and a sample image of the head region having the predetermined size previously stored in a sample image storage; and determining that the moving object is the human being on the basis of the similarity.

An eighth aspect of the present invention provides a human being detecting program for causing a computer to operate, to detect a human being from a plurality of picture images shot by a plurality of cameras, to have functions of: a moving object detecting part that detects a target region of the moving object in the picture images and a target distance to the moving object from the camera as moving object information on the basis of parallaxes in picture images and a difference between picture images sequentially entered; a head region setting part that sets a head region as having a predetermined size corresponding to the target distance in the target region detected by the moving object detecting part when it is assumed that the moving object is the human being; a sample image storing part for storing a sample image having a predetermined size corresponding to the head region of the human being; and a human being determining part that determines whether the moving object is the human being by converting the head region set by the head region setting part in the picture image into an image having the predetermined size and comparing the converted head region with the sample image to determine the moving object is the human being.

BRIEF DESCRIPTION OF THE DRAWINGS

The object and features of the present invention will become more readily apparent from the following detailed description taken in conjunction with the accompanying drawings in which:

FIGS. 20A to 20G are illustrations for showing contents at respect stages of an enlargement and reduction process for a normalized image; and FIGS. 21A to 21E are illustrations for showing detection results when the human being is located in a picture image.

The same or corresponding elements or parts are designated with like references throughout the drawings.

DETAILED DESCRIPTION OF THE INVENTION

Hereinafter with reference to drawing will be described an embodiment of the present invention.

[Configuration of Human Being Detection Apparatus]

Figure 1:
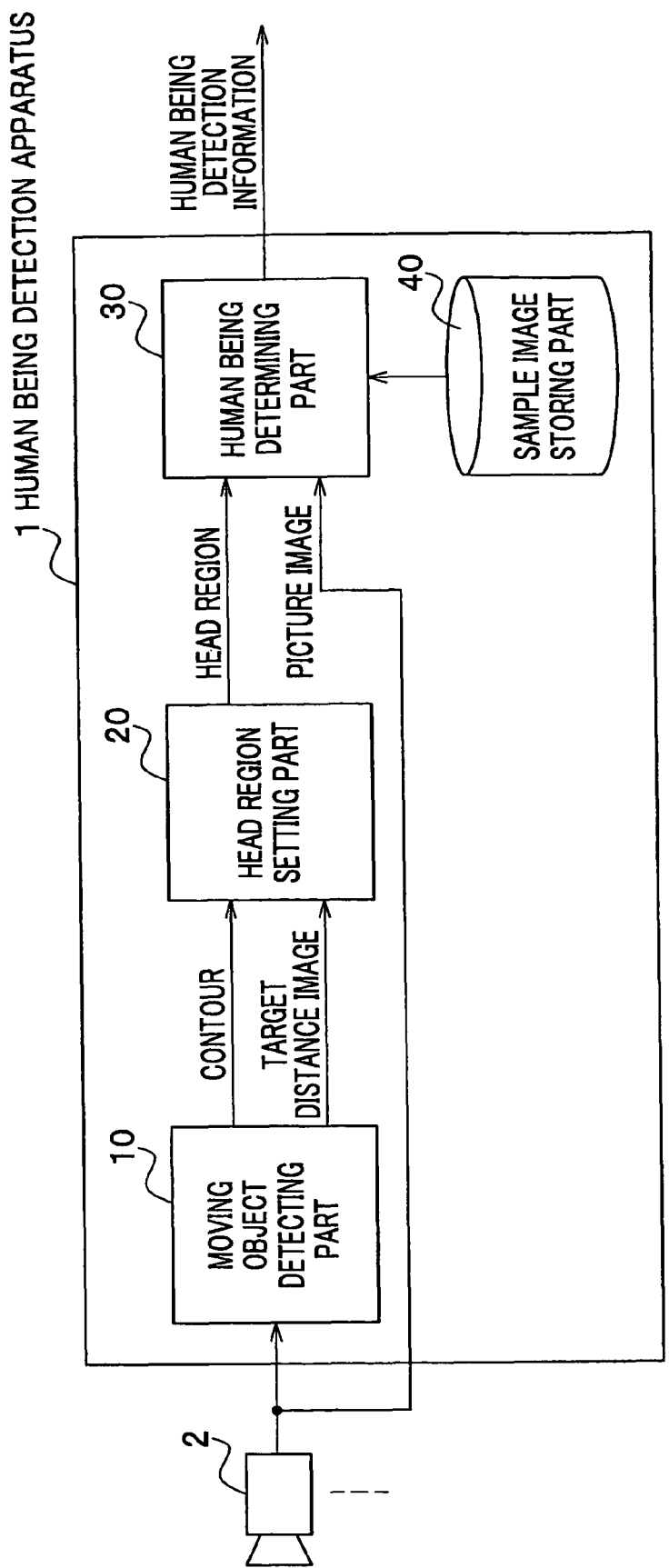
FIG. 1 is a block diagram of a human being detection apparatus according to an embodiment of the present invention.

FIG. 1 is a general block diagram of a human being detection apparatus. As shown in FIG. 1, the human being detection apparatus 1 detects a human being from picture images shot by a plurality of cameras 2. In this embodiment, the human being detection apparatus 1 includes a moving object detecting part 10, a head region setting part 20, a human being determining part 30, and a sample image storing part 40.

The moving object detecting part 10 detects a moving object showing a movement from picture images shot by a plurality of the cameras 2. In the embodiment, the moving object detecting part 10 extracts a region of the moving object from the picture image as a contour (a target region) and generates a target distance image (a target distance) including pixels having values corresponding to distances from the cameras 2 to supply a contour and the target distance image to the head region setting part 20 as moving object information.

The head region setting part 20 sets a head region having a predetermined size with an assumption that the moving object is a human being to have a size corresponding to the target distance on the basis of the contour (the target region) and the target distance image (target distance) of the moving object detected by the moving object detecting part 10. In the embodiment, the head region setting part 20 sets the head region with the assumption that the moving object is a human being within a predetermined region based on the pixel position of an upper part of the contour (for example, the uppermost part) on the basis of a pixel distribution of the target distance image. The head region set by the head region setting part 20 is supplied to the human being determining part 30.

The human being determining part 30 is for determining whether the moving object is a human being on the basis of the head region set by the head region setting part 20. In the embodiment, the human being determining part 30 determines whether the moving object is a human being by comparing the image of the head region with the sample image previously stored in the sample image storing part 40. In this event, the human being determining part 30 can perform the comparison by adjusting the image of the head region in size with a sample image on the basis of the target distance.

Figures 10A, 10B, 10C:
FIGS. 10A to 10C show an example of sample images stored in a sample image storing part.

The sample image storing part 40 is a general storage unit such as a hard disk drive for previously storing an image showing a shape of the head region of a human being. The sample image storing part 40 stores a plurality of patterns of the sample images having a predetermined size (for example 32×32 pixels). The plurality of patterns are, as shown in FIG. 10, those when the human being turns in a front direction, when the human being turns to the left, and when the human being turns to the right. Further in the embodiment, the sample image is a binary image in which the region of the human being is sectioned from the background region with edges.

As mentioned above, the human being detection apparatus 1 can detect a human being irrespectively of a distance to the human being even under such a miscellaneous circumstance as one in an office in which a part of the human being is hindered by a desk or the like because the human being detection apparatus 1 determines whether the moving object is the human being on the basis the head region of the human being related to the distance.

Hereinafter will be described in details configurations of the moving object detecting part 10, the head region setting part 20, and the human being determining part 30.

<Moving Object Detecting Part 10>

Figure 2:
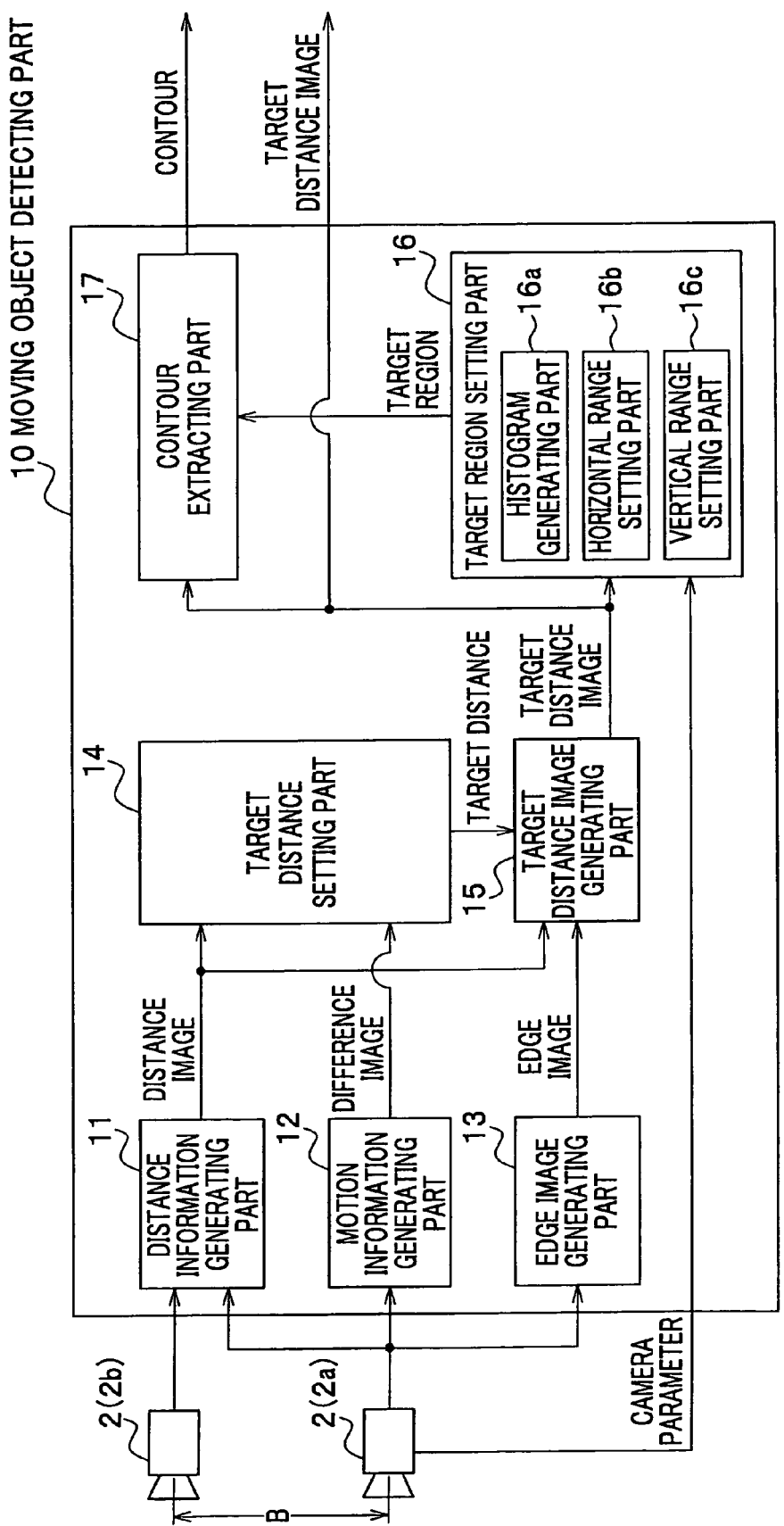
FIG. 2 is a block diagram of a moving object detecting part shown in FIG. 1.

With reference to FIG. 2, will be described, a configuration of the moving object detecting part 10. FIG. 2 is a block diagram of the moving object detecting part 10 included in the human being detection apparatus 1 according to the present inventions. As shown in FIG. 2, the moving object detecting part 10 detects an object with movement (a moving object) from the picture images shot by two cameras 2. Further, two cameras 2 are arranged a distance B apart from each other in a right-left directions and are referred to as a right camera 2a and a left camera 2b, respectively.

In the first embodiment, the moving object detecting part 10 includes a distance information generating part 11, a motion information generating part 12, an edge image generating part 13, a target distance setting part 14, a target distance image generating part, 15, a target region setting part 16, and a contour extracting part 17.

The distance information generating part 11 detects and embeds parallaxes existing between two picture images shot by the right camera 2a and the left camera 2b at the same time on an image as distance information from the camera (more specifically, from a focal position of the camera 2) to target objects to generate a distance image. Further, the distance information generating part 11 receives the picture image at a rate of one frame with an interval of, for example, 100 ms.

The distance information generating part 11 performs, with assumption that the right camera 2a is regarded as a reference camera 2a, block-matching between a reference picture image shot by the reference camera (right camera 2a) and the picture image shot at the same time by the left camera 2b at a unit of block having a predetermined size (for example, 8×3 pixels) to measure the parallaxes from the reference picture image. The distance information generating part 11 generates the distance image in which each pixel is related with a magnitude of the parallax (parallax amount) in each pixel of the reference picture image.

Here, if the parallax is assumed as Z, a distance L (not shown) from the cameras 2 to the object related to the parallax can be obtained by Eq. (1) where a focal length of the cameras 2 is f (not shown) and the distance between the right camera 2a and the left camera 2b is B.

$$L = B \times f / Z \quad (1)$$

The motion information generating part 12 generates a difference image in which motions of moving objects within the picture image are embedded as motion information on the basis of differences between two sequential picture images shot by the reference camera (right camera 2a).

The motion information generating part 12 calculates differences between the picture images shot at a different time by the reference camera (right camera 2a) in which the right camera 2a is regarded as the reference camera. For example, in a case that the picture image is entered at an interval of 100 ms, a picture image delayed by Δt (for example, 33 ms) from the input time is generated to calculate differences between the two picture images.

A difference image is generated in which a pixel value of "1" is applied to pixels having the difference, and a value of "0" is applied to pixels having no differences. Further, the motion information generating part 12 removes noise from the difference image by a filtering process such as a median filter.

In addition, in a case that a background varies within the picture image because the cameras 2 are such movable cameras as mounted on a robot or a motor vehicle, a position adjustment of the background is carried out by compensating an picture image shot at a time t+Δt by an amount of movement of the cameras 2 by entering the amount of movement of the cameras 2 such as panning and tilting for each picture image from the cameras 2 to extract an image having a movement between a time t and a time t+Δt.

The edge image generating part 13 is supplied with the picture image (reference picture image) from the camera 2 (2a) to generate an edge image in which edges are extracted from the picture image. The edge image generating part 13 detects parts having large brightness changes on the basis of the brightness (luminance: gray scale information) of the picture image supplied from the camera 2 (2a) to generate the edge image only including the edges.

For example, the edges are detected by an operator having a weighting coefficient for pixels at a neighboring region of a subject pixel (coefficient matrix: a Sobel operator, Kirsch operator, and the like) by multiplying a value in each of the pixels by the weighting coefficient.

Figure 11:
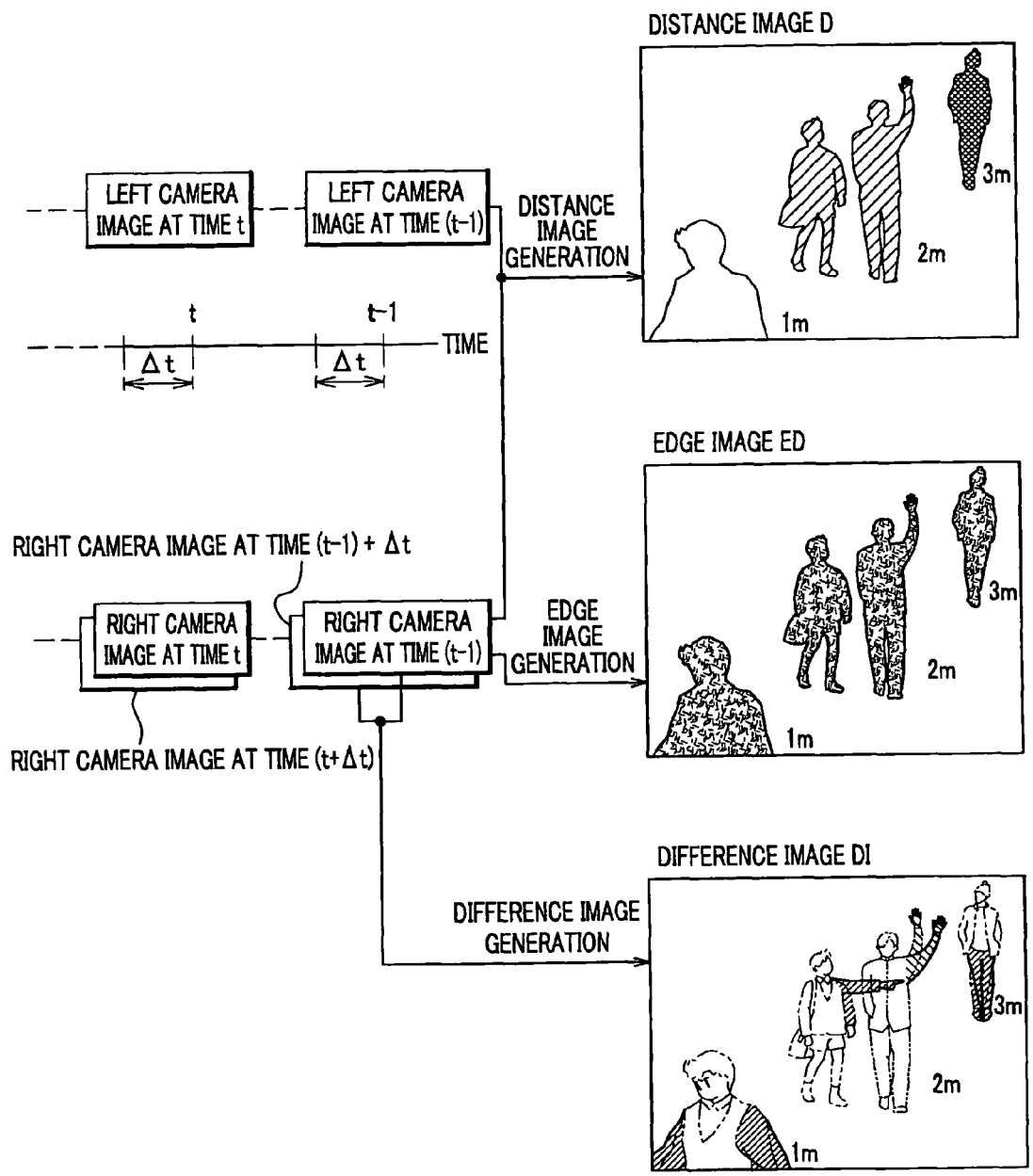
FIG. 11 shows an illustration of an example of contents in a distant image, an edge image, and a difference image.

With reference to FIG. 11 (occasionally, FIG. 2) will be described the distance image generated by the distance information generating part 11, the difference image generated by the motion information generating part 12, and the edge image generated by the edge image generating part 13. FIG. 11 shows statuses in a process of generating these images on the basis of the picture image sequentially supplied.

As shown in FIG. 11, a distance image D is generated by a pixel value calculated from a parallax between the picture image (right camera image) taken by the right camera 2a and the picture image (left camera image) from the left camera 2b at the same time. The larger the value of the parallax, the closer the human being is located to the camera 2, and the smaller the value of the parallax, the farther the human being is located from the camera 2. The edge image ED is generated from the right camera image and includes only the detected edges. The difference image DI is generated by calculating differences between two right camera images at different times with a time difference Δt (for example, right camera images at a time t and a time t+Δt) and representing pixels having the difference with a pixel value of "1" and pixels having no difference with a pixel value of "0". The pixels having the difference represent the region where the human being moves.

Figure 12A:
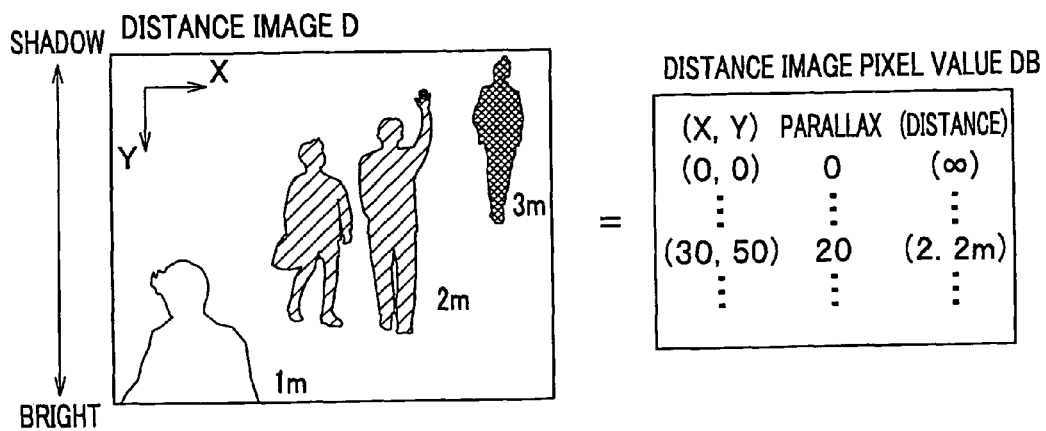
FIGS. 12A and 12B show an example of contents in the distance image and the difference image.
Figure 12B:
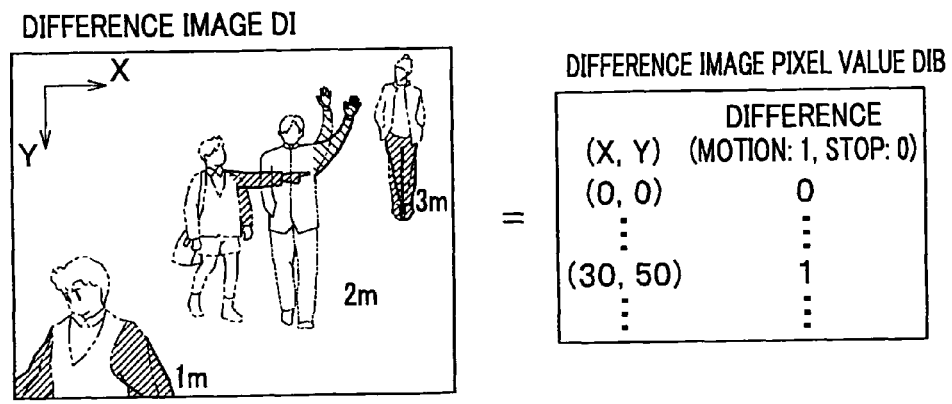

With reference to FIG. 12 will be described in details the distance image D and the difference image DI. FIG. 12A shows an example of a content of the distance image D and pixel values (distance image pixel value DB) of the same. FIG. 12B shows an example of a content of the difference image DI and pixel values (difference image pixel values DIB).

In the embodiment, it is assumed that the human beings are located about 1, 2, and 3 m apart from the camera 2, respectively.

The distance image D represents, as shown in FIG. 12A, the parallax in pixel values between the right camera image and the left camera image at the same time. For example, as shown in the distance image pixel values DB, the parallax at the pixel position (0, 0) of the distance image D is zero, and thus a distance from the cameras 2 is infinite (∞). Further, the parallax at the pixel position (30, 50) of the distance image D is 20, and thus, a distance from the cameras 2 is, for example, 2.2 m. Thus, the distance image D represents the parallax as the pixel value. For example, the closer to the cameras 2, the brighter the image is and the farther from the cameras 2 the darker the image is.

The difference image DI represents, as shown in FIG. 12B, a difference between the right camera images sequentially entered. For example, as shown by difference image pixels DIB, a pixel position (0, 0) of the difference image DI indicates a value of "0", i.e., "stop" indicating motionless. On the other hand, a pixel position (30, 50) on the difference image DI indicates a value of "1", i.e., "motion" indicating a motion.

Returning to FIG. 2, the human being detection apparatus 1 will be described in the configuration.

A target distance setting part 14 specifies a moving object showing a largest motion amount on the distance image generated by the distance information generating part 11 and the difference image generated by the information generating part 12 and sets a target distance of a moving object to be a target. The target distance is supplied to a target distance image generating part 15.

The target distance setting part 14 accumulates pixel values of difference images at the same distance as a pixel corresponding to the parallax for each parallax (distance) represented in the distance image (counts pixels for each parallax because the pixel showing a motion has the pixel value of "1"). The target distance setting part 14 determines that the moving object having the largest amount of motion is located at the parallax showing the largest accumulated value (hereinafter referred to as "most frequent parallax"). For example, a total is calculated for each parallax such that, in a case of parallax (distance) of from 1.0 to 1.1 m, a total of the pixel values is 110, and in a case of the parallax from 1.1 to 1.2 m, the total is 92, wherein a maximum total of the parallax (distance) among the totals is determined as a most frequent parallax.

In this embodiment, a depth defined by the target distance $\pm\alpha$, corresponding to the most frequent parallax, is determined as a distance region where the moving object having a largest amount of motion is located. A value of $\alpha$ represents the region in a depth direction based on the target distance. In this embodiment, the value of $\alpha$ is assumed as a difference between distance images sequentially supplied from the distance information generating part 11, namely, for example, a distance between the distance image generated at a time t-1 and that generated at a time t. The value of $\alpha$ may be a fixed value of tens cm assuming that the human being is to be detected.

The target distance setting part 14 stores the distance image generated by the distance image generating part 11 and the difference image generated by the motion information generating part 12 in a storage unit such as memory (not shown).

The distance image generating part 15 generates a target distance image derived by extracting the pixels corresponding to the target distance set by the target distance setting part 14 from the edge image generated by the edge image generating part 13 on the basis of the distance image in which amounts of parallaxes generated by the distance information generating part 11 are embedded.

For example, in a case that the distance L from the cameras 2 to the moving object at the most frequent parallax is calculated by the above-described equation (1), the following equation (2) defining a region Zr of the parallax is obtained through modifying the equation (1). Here, it is assumed that the focal length of the cameras 2 is f, the distance between the right camera 2a and the left camera 2b is B, and the region in the depth direction of the target object is $\alpha$.

$$B \times f/(L+\alpha) < Zr < B \times f/(L-\alpha) \quad (2)$$

The target distance image generating part 15 generates the target distance image derived by extracting the pixels corresponding to the parallax within the region defined by the equation (2) from the edge image.

The target distance image may be generated by extracting pixels only at pixel positions corresponding to the target distance (a region of the parallax) from the picture image (original image) shot by the reference camera (right camera 2a) or the distance image generated by the distance information generating part 11.

Figure 13A:
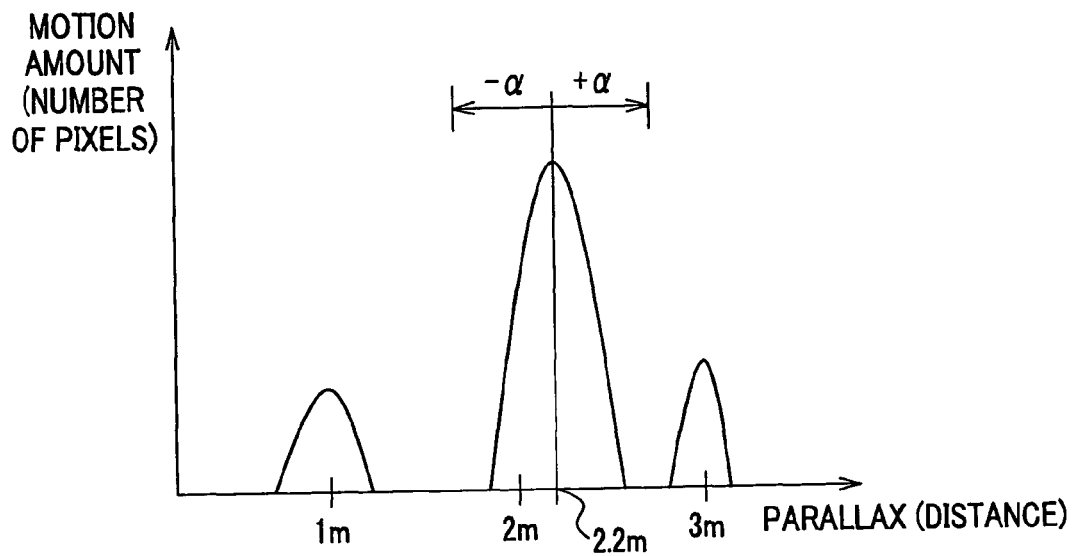
FIGS. 13A and 13B show illustrations for a process of generating a target distance image on the basis of a moving amount (pixel value) for each parallax (distance)
Figure 13B:
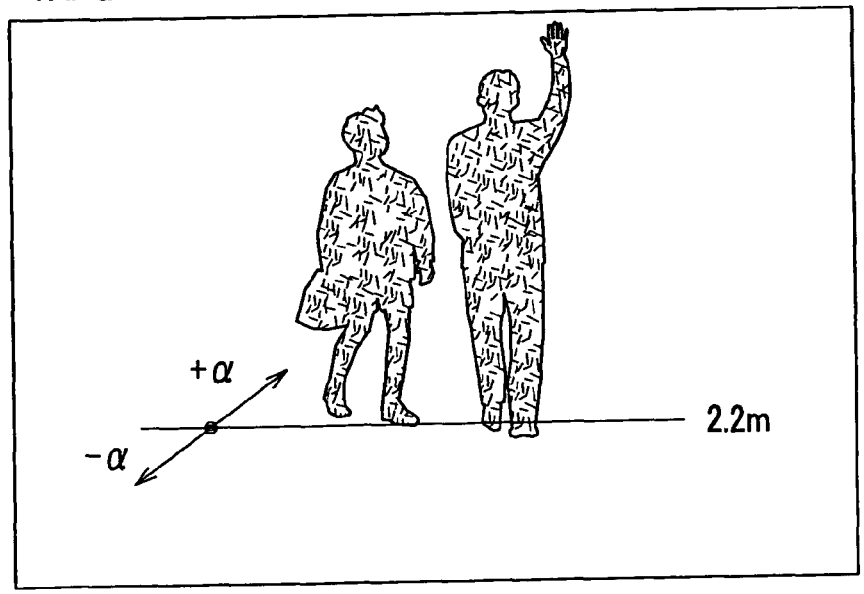

With reference to FIG. 13 (occasionally FIG. 2) will be described a process of generating an image (target distance image) corresponding to the distance where the moving object to be detected is located using the target distance setting part 14 and the target distance image generating part 15. FIG. 13A shows a graph representing a relation between the parallax (distance) and the amount of motion (the number of pixels) which is a total of pixels having the parallax (distance) and motion on the basis of the distance image D and the difference image DI (FIG. 12). FIG. 13B shows a target distance image TD obtained by extracting only images of the target distances from the edge image ED (FIG. 11).

As shown in FIG. 13A, a relation between a parallax (distance) in the distance image D (FIG. 12) and the amount of motion (the number of pixels) is represented in a graph, in which peaks appear at distances of 1 m, 2.2 m, and 3 m. Then, the target distance setting part 14 estimates that the moving objects having maximum amounts of motions are located at the parallax of 2.2 m and determines that the moving objects are located in the depth region having the depth of $\pm\alpha$ around the parallax of 2.2 m. The value of $\alpha$ is a difference between the distance images sequentially entered from the distance information generating part 11. Further, it may be determined that a human being is located in the region having a distance of $2.2\pm\alpha$ m ($\alpha=0.5$ m) from the camera 2 based on an assumption that the moving object is a human being.

Further, the target distance image generating part 15 determines, as shown in FIG. 13B, pixel positions to be a target from the edge image generated by the edge image generating part 13 on the basis of the distance image generated by the distance information generating part 11 to generate the target distance image TD derived by extracting the pixels at the target distances $\pm\alpha$ m. This generates the target distance image TD in which only the human being located at the position $2.2\pm\alpha$ m apart from the cameras 2 is extracted as an edge image with removal of the images of the human beings located at positions 1 m and 3 m apart from the cameras 2.

Returning to FIG. 2, the configuration of the human being detection apparatus 1 will be further described.

The target region setting part 16 counts the number of pixels in the vertical direction in the target distance image (the edge image corresponding to the target distance) generated by the target distance image generating part 15 and determines as a horizontal position of a center of the moving object a position where the number of the pixels in the vertical direction is largest to set a region including the moving object (target region). In the embodiment, the target region setting part 16 includes a histogram generating part 16a, a horizontal range setting part 16b, and the vertical range setting part 16c.

The histogram generating part 16a counts the number of the pixels in the target distance image in the vertical direction to obtain totals. In the embodiment, the histogram generating part 16a obtains a distribution of the numbers of the pixels counted in the horizontal direction to generate a histogram. The histogram is generated as mentioned above, which allows determination whether a center of the moving object is located at a position where the histogram shows a maximum frequency. Further, the histogram generating part 16a performs a smoothing process for the histogram.

The horizontal range setting part 16b sets a region in the horizontal direction of the target region for extracting a contour of the moving object including the moving object on the basis of the histogram generated by the histogram generating part 16a. More specifically, the horizontal range setting part 16b sets a region of the moving object in the horizontal direction from the horizontal position where the number of the pixels becomes largest in the histogram generated and smoothed by the histogram generating part 16a.

Figure 14:
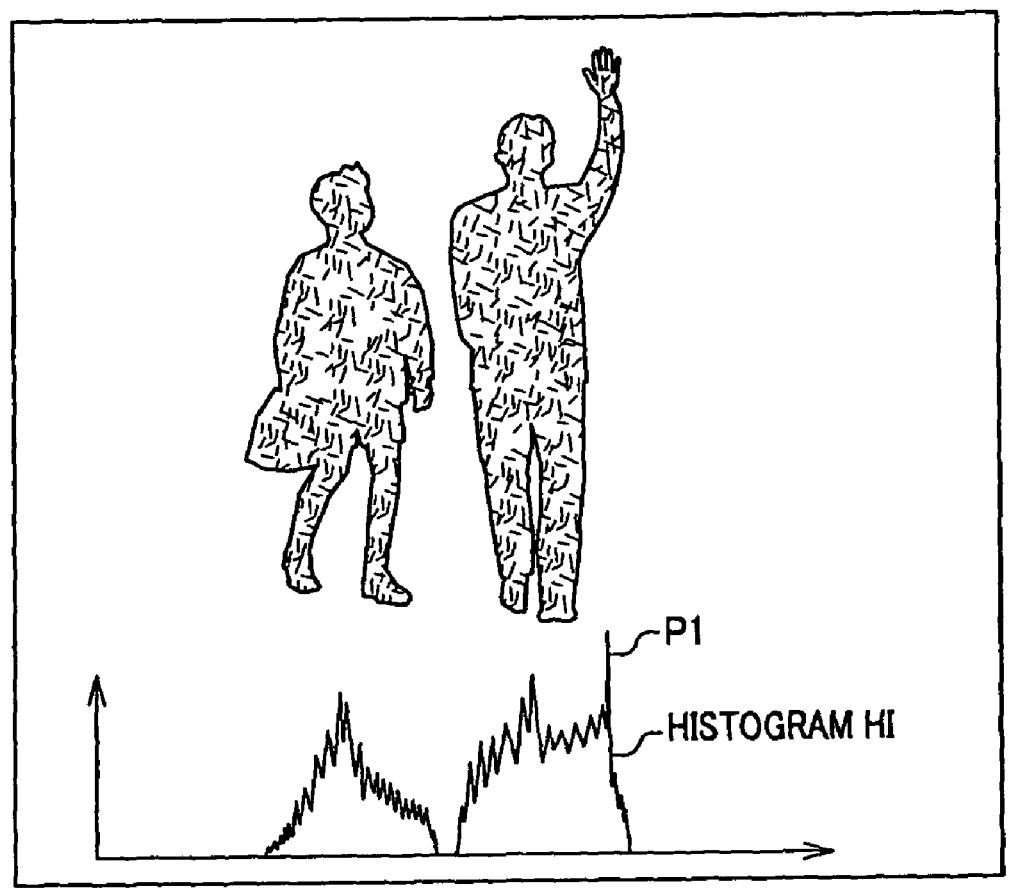
FIG. 14 shows a histogram in a target distance image TD in which pixels in the horizontal direction is counted for each section of the horizontal direction.
Figure 15A:
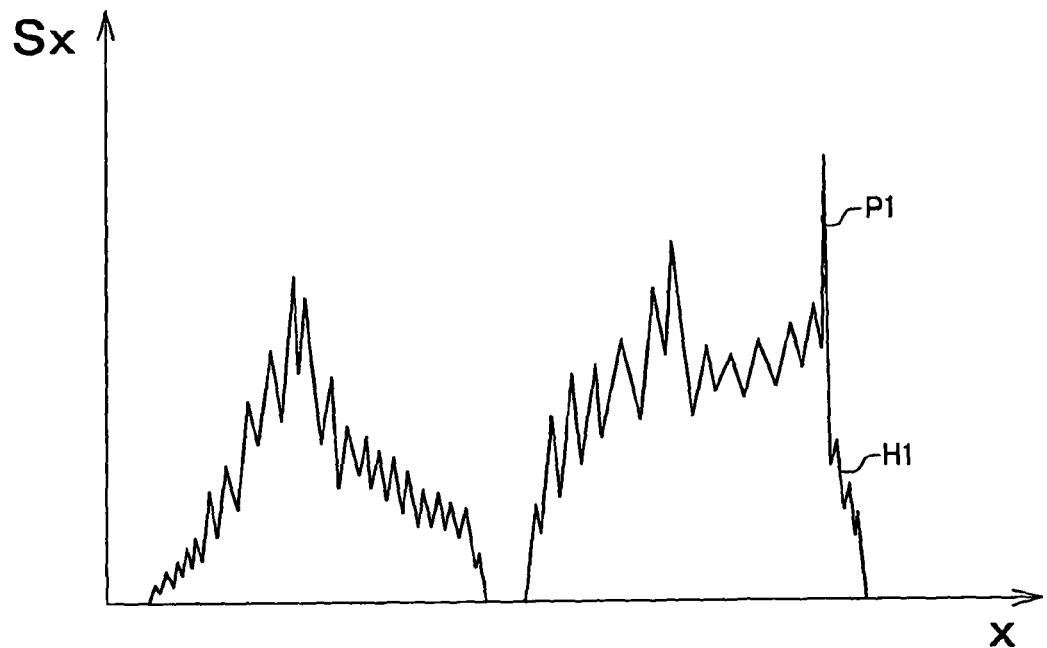
FIG. 15A is a histogram before a smoothing process.
Figure 15B:
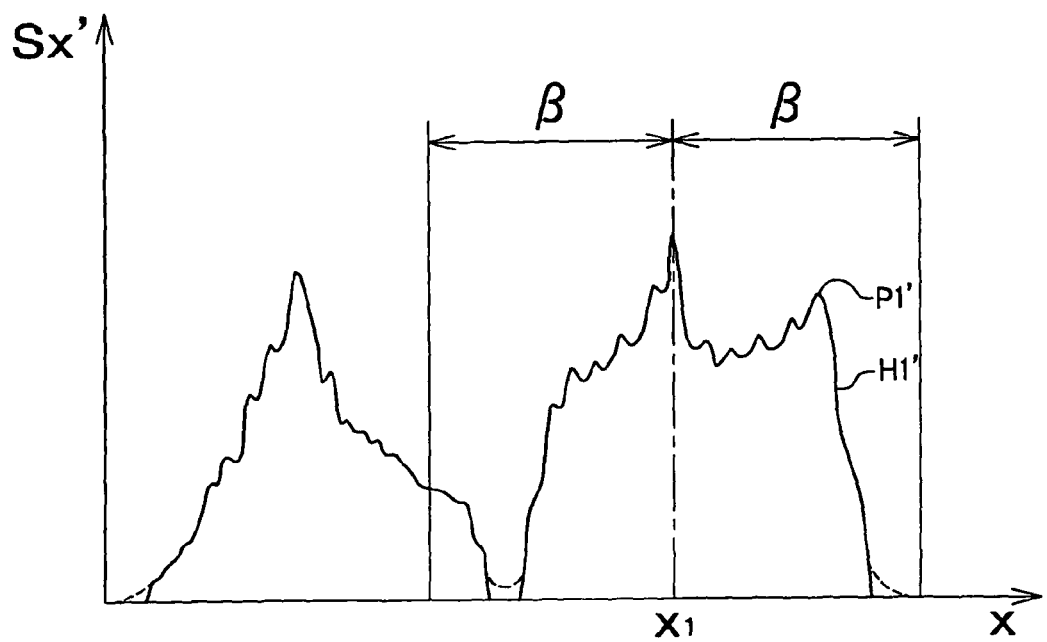
FIG. 15B is a histogram after the smoothing process.

With reference to FIGS. 14 and 15 (occasionally see FIG. 2) will be described a process in which the target region setting part 16 sets the horizontal range of the region (target region) of one moving object (one human being) in the target distance image TD. FIG. 14 shows the histogram in which a distribution of the number of pixels counted for each of the horizontal coordinates is shown. In FIG. 14, the histogram HI is superimposed on the target distance image TD only to simplify the description. FIGS. 15A and 15B show an example of the smoothing process for the histogram, in which FIG. 15A shows a status before the smoothing and FIG. 15B shows a status after the smoothing.

First, the histogram generating part 16a counts the pixels in vertical direction at each horizontal coordinate and determines a distribution of the counted results to generate the histogram HI in the region where the moving object included in the target distance image TD is located. In the histogram HI in FIG. 14, it is assumed that a peak P1 occurs locally.

The histogram generating part 16a performs, as shown in FIG. 15, the smoothing process for the histogram HI.

More specifically, assuming that $S_x$ is the number of the pixels at a subject horizontal coordinate x in the histogram HI, $S_x'$ is the number of the pixels at the subject coordinate x in the histogram HI' after the smoothing, and xo is a positive constant value, the smoothing is performed by the following Eq. (3).

$$S_x' = \sum_{n=x-x_0}^{x-1} \frac{S_n}{f(n)} + S_x + \sum_{n=x+1}^{x+x_0} \frac{S_n}{f(n)} \quad (3)$$

Where, f(n) is a function of n. However, it may be a constant. As shown in Eq. (4) in a case that f(n)=|x−n|, the closer in distance (along the coordinate) to the coordinate x a coordinate n showing the number Sn of pixels is, the more weighted the number Sn of pixels is. Thus, the histogram HI' after the smoothing is generated with a characteristic of the original histogram HI left.

$$S_x' = \sum_{n=x-x_0}^{x-1} \frac{S_n}{|x-n|} + S_x + \sum_{n=x+1}^{x+x_0} \frac{S_n}{|x-n|} \quad (4)$$

This process generates the smoothed histogram HI' as shown in FIG. 15B from the histogram HI as shown in FIG. 15A. As a result, the peak P1 locally appearing in the histogram HI is lowered as a peak P1'.

Further, in the smoothing process according to the Eq. (3) or (4), preferably, the following Eq. (5) is established as a condition.

$$\text{IF } \sum_{n=x-x_0}^{x-1} S_n = 0 \text{ OR } \sum_{n=x+1}^{x+x_0} S_n = 0, S_x' = 0 \quad (5)$$

According to the condition defined by Eq. (5), because the number $S_x$ of the pixels in the histogram HI on the right side (a larger value in x) of the subject coordinate x or the left side (a smaller value in x) of the subject coordinate x are all "0", the number $S_x'$ of the pixels after the smoothing are made "0". This prevents left and right feet of the histogram HI from extending. For example, the feet are shown by solid lines in FIG. 15B without extension of the feet of the histogram HI as broken lines in FIG. 15B.

This prevents curves in the histogram HI of the adjacent human beings from being connected by the smoothing process.

The horizontal range setting part 16b sets a range in the horizontal direction including one moving object on the basis of the histogram generated by the histogram generating part 16a.

More specifically, in the histogram HI' after the smoothing described in FIG. 15B, a coordinate x showing the largest number of pixels $S_x'$ (for example, $_x1$ in FIG. 15B) is determined as the center of one moving object, and predetermined ranges (for example, β in FIG. 15B) on the left and right sides of the center are set as a horizontal range of the target region. The β is determined to have the number of the pixels which corresponds to a width of the human being or a region slightly wider the width (by, for example, the number of pixels corresponding to 0.2 m). Further, horizontal positions (coordinate x) showing the smallest histogram value are detected within this range. The positions showing the smallest histogram value are determined as one of the left and right edges of one human being.

In a case that the region for extracting the moving object is set in the horizontal direction, it is preferable to consider a moving direction of the moving object. For example, the horizontal range setting part 16b obtains a moving vector of the moving object on the basis of the center position of the moving object obtained from the histogram generated from the target distance image at a time of t-2 and the center position of the moving object obtained from the histogram generated from the target distance image at a time of t-1, and when an angle between the moving vector and a view direction of the cameras 2 is smaller than 45°, the horizontal range for detecting the human being is determined by the positions of ±0.5 to 0.6 m from the center position. Further, when the angle between the moving vector and the view direction of the cameras 2 is not smaller than 45°, the horizontal range for detecting the human being is the center position ±0.2 to 0.3 m. This is because the case of the angle not smaller than 45° is considered that the human being crosses in front of the cameras 2.

Further, the horizontal range of the target region can be set by obtaining the number $\alpha_H$ of pixels in the horizontal direction on the target distance image when half the width of the target region (a distance from the center of the moving object) is 0.5 m by solving the following Eq. (6), with an assumption (not shown) that a horizontal angle of the cameras 2 is $\theta_h$, a distance from the cameras 2 to the target moving object is L, and a resolution in a lateral direction of the target distance image is X.

$$\alpha_H = (X/\theta_h)\tan^{-1}(0.5/L) \quad (6)$$

Returning to FIG. 2, the configuration of the human being detection apparatus 1 will be further described.

The vertical range setting part 16c sets a region in the vertical direction to be a target for extracting a contour of the moving object (the target region). In the embodiment, the vertical range setting part 16c determines a specific length (for example, 2 m) as the region in the vertical direction of the target region.

Figure 16A:
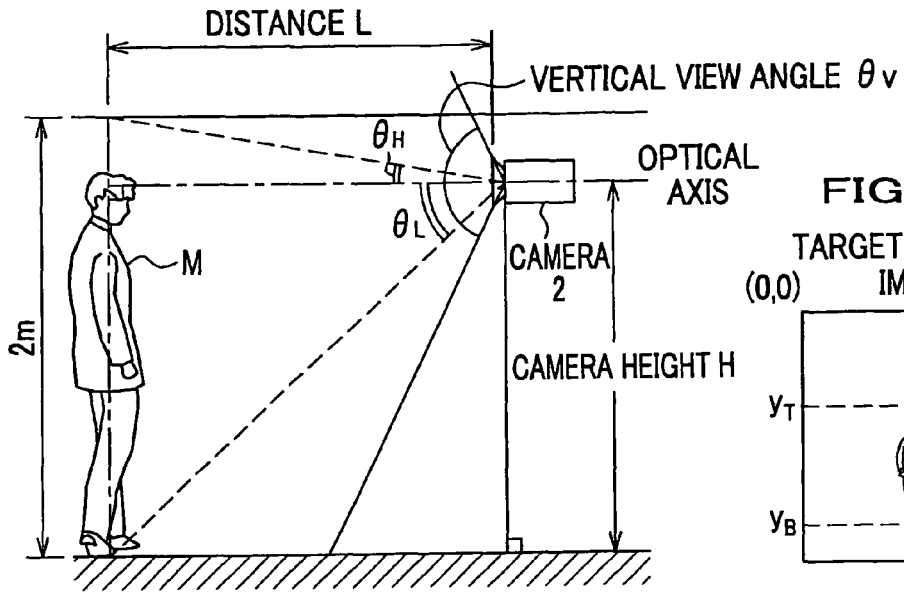
FIGS. 16A and 16D are illustrations for a calculation process of obtaining a vertical position of the moving object on the target distance image.
Figure 16B:
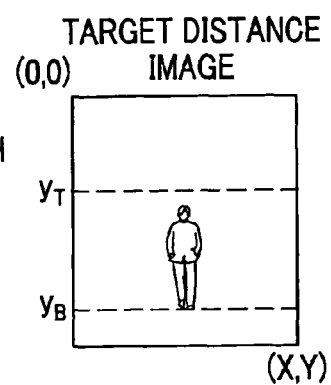
Figure 16C:
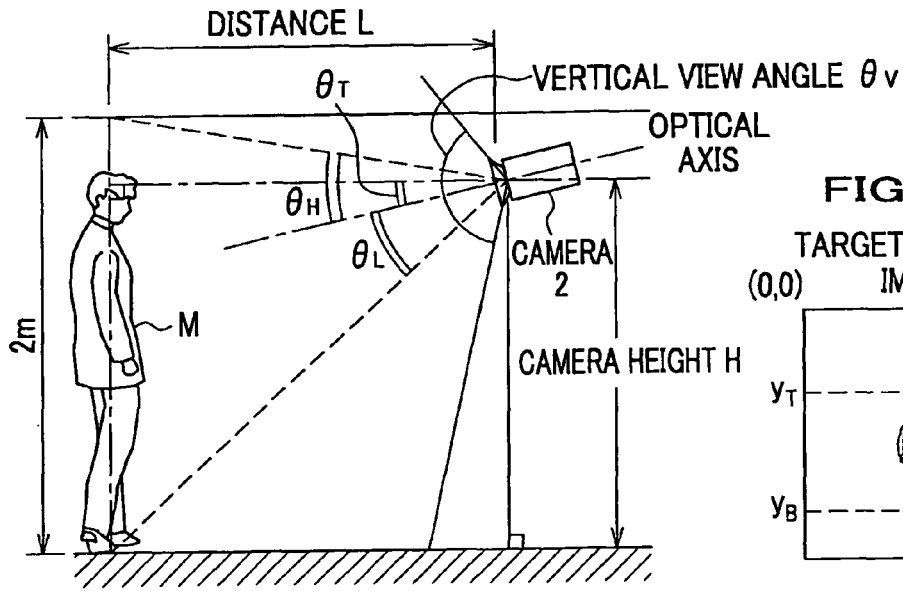
Figure 16D:
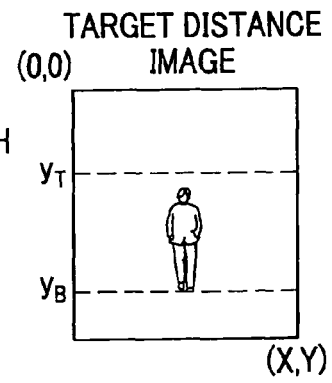

With reference to FIGS. 16A and 16B (occasionally see FIG. 2) will be described a process in which the target region setting part 16 (the vertical range setting part 16c) sets a region in the vertical direction of the region (target region) of one moving object (one human being) regarding the target distance image. FIGS. 16A and 16B are illustrations for describing the process of calculating a position in height of the moving object on the target distance image. FIGS. 16A to 16D show a case in which the cameras 2 are installed in a mobile robot (not shown) and located at a certain height (camera height) H from the floor on which is the movable object M is supported and indicate how height the moving object M is located on the target distance images a' and b'. FIG. 16A shows a relation between the cameras 2 and the moving object M in which a tilt angle of the cameras 2 is 0°, FIG. 16B shows a target distance image in this condition, FIG. 16C shows another relation between the cameras 2 and the moving object M in which the tilt angle of the cameras 2 is $\theta_T (\neq 0°)$, and FIG. 16D shows a target distance image in this condition.

First, with reference to FIG. 16A will be described a process of determining what position in the vertical direction the moving object M is located on the target distance image (a') in the case that the tilt angle is 0°.

Here it is assumed as follows:

A vertical angle of view (view angle) of the cameras 2 is $\theta_V$, the distance from the cameras 2 to the moving object M is L, and a resolution in the vertical direction of the target distance mage a' is Y, a height of the cameras 2 from the floor (camera height) is H, and a virtual height of the moving object M from the floor is 2 m. In this condition, an angle $\theta_H$ between an optical axis of the camera and a line between the cameras 2 and a virtual upper end of the moving object M (2 m from the floor) is given by the following Eq. (7).

$$\theta_H = \tan^{-1}((2-H)/L) \tag{7}$$

Thus, the upper end $y_T$ on the target distance image a' of the moving object M is given by the following Eq. (8).

$$y_T = Y/2 - \theta_H Y/\theta_V = Y/2 - (Y/\theta_V)\tan^{-1}((2-H)/L) \tag{8}$$

Further an angle $\theta_L$ between the optical axes of the cameras 2 and a line between the cameras 2 and a lower end of the moving object M (floor) is given by the following Eq. (9).

$$\theta_L = \tan^{-1}(H/L) \tag{9}$$

Thus, the lower end $y_B$ on the target distance image in FIG. 16B of the moving object M is given by the following Eq (10).

$$y_B = Y/2 + \theta_L Y/\theta_V = Y/2 + (Y/\theta_V)\tan^{-1}(H/L) \tag{10}$$

Next, with reference to FIG. 16C will be described a process of determining what position in the vertical direction the moving object M is located on the target distance image in FIG. 16D in the case that the tilt angle is $\theta_T (\neq 0)$.

Here it is assumed that a vertical angle of view (view angle) of the cameras 2 is $\theta_V$, the tilt angle is $\theta_T$, the distance from the cameras 2 to the moving object M is L, and a resolution in the vertical direction of the target distance mage is Y, a height of the cameras 2 from the floor (camera height) is H, and a virtual height of the moving object M from the floor is 2 m. In this condition, the angle $\theta_H$ between optical axes of the cameras 2 and the line between the cameras 2 and the virtual upper end of the moving object M (2 m from the floor), and a difference angle between the tilt angle $\theta_T (\theta_H - \theta_T)$ is given by the following Eq. (11).

$$\theta_H - \theta_T = \tan^{-1}((2-H)/L) \tag{11}$$

Thus, the upper end $y_T$ of the moving object M on the target distance image in FIG. 16D is given by the following Eq. (12).

$$y_T = Y/2 - \theta_T Y/\theta_V - (\theta_H - \theta_T)Y/\theta_V = Y/2 - \theta_T Y/\theta_V - (Y/\theta V)\tan^{-1}((2-H)/L) \tag{12}$$

An addition angle $(\theta_L + \theta_T)$ made by the angle $\theta_L$ between the optical axis of the cameras 2 and the line between the cameras 2 and the lower end (floor) of the moving object M and a tilt angle $\theta_T$ are given by the following Eq. (13).

$$\theta_L + \theta_T = \tan^{-1}(H/L) \tag{13}$$

Thus, the lower end $Y_B$ on the target distance image in FIG. 16D of the moving object M is given by the following Eq. (14).

$$y_B = Y/2 - \theta_T Y/\theta_V + (\theta_L + \theta_T)Y/\theta_V = Y/2 - \theta_T Y/\theta_V + (Y/\theta_V)\tan^{-1}(H/L) \tag{14}$$

The region in the vertical direction of the target region is set by the upper end $y_T$ and the lower end $y_B$ on the target distance images in FIGS. 16B and 16C thus obtained.

Further, in a case that the mobile robot (not shown) is not located on the same floor as the moving object M because the mobile robot has climbed a stair case or the like, a position in the vertical direction on the target distance images in FIGS. 16B or 16D of the moving object M can be specified by detecting an amount of ascending with an encoder or the like in the body of the moving robot and adding or subtracting the mount of ascending to or from the height of the moving object M from the floor. Alternatively, this may be done by, after previously storing map information in the mobile robot, obtaining the height of the floor specified by a direction and a distance of the moving object M from the map information.

Returning to FIG. 2 the configuration of the human being detection apparatus 1 will be further described.

The contour detecting part 17 extracts a contour of the moving object with a known contour extracting technology within the region of the moving object (target region) set by the target region setting part 16 on the target distance image generated by the target distance image generating part 15.

As the known contour extraction technology can be used a dynamic contour model referred to as "SNAKES". The "SNAKES" is a technology in which a contour of an object is extracted by shrinkage-deforming a closed curve such that a previously defined energy is minimized. This can reduce an amount of calculation for extracting the contour because an initial value for calculating the energy within the region of the moving object (target region) can be set.

Figure 17:
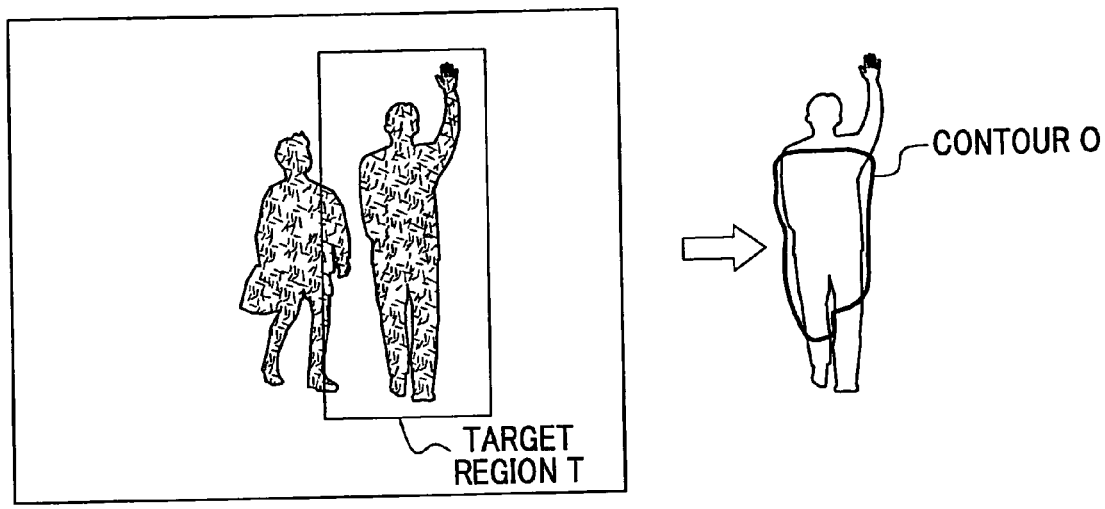
FIG. 17 shows illustrations for an example of extracting a contour in the target region on the target distance image.

The contour extracting part 17 supplies the extracted contour (contour information) to the head region setting part 20 (see FIG. 1). This provides extraction of a contour O within the target region T limited to one moving object (one human being) on the target distance image TD as shown in FIG. 17 to approximately specify the position of the moving object.

<Head Region Setting Part 20>

Next, with reference to FIG. 3 will be described a configuration of the head region setting part 20.

Figure 3:
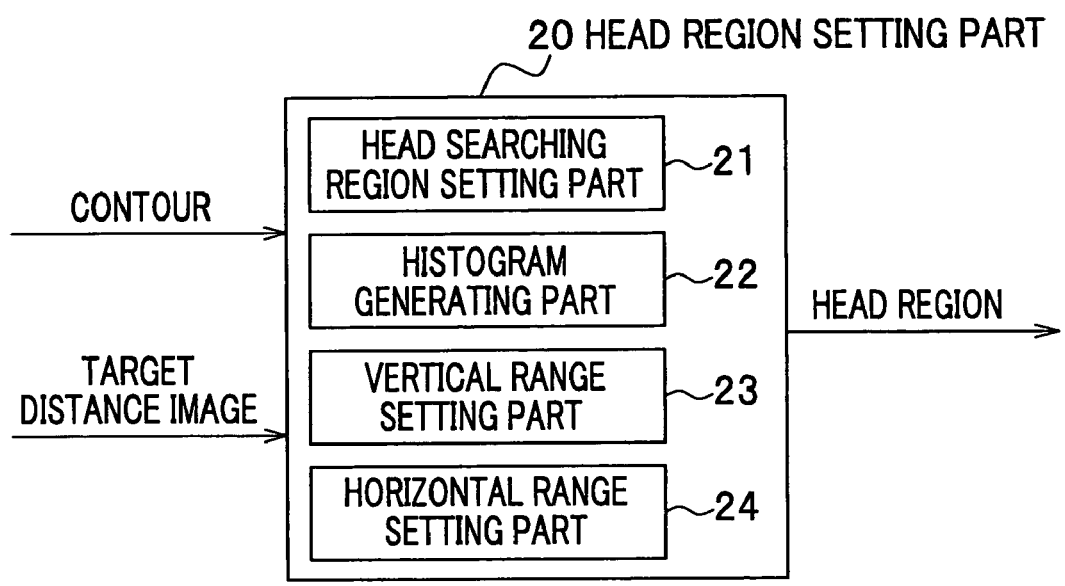
FIG. 3 is a block diagram of a head region setting part shown in FIG. 1.

FIG. 3 is a block diagram of the head region setting part 20 included in the human being detection apparatus 1 according to the present invention. As shown in FIG. 3 the head region setting part 20 sets a head region on the basis of the contour of the moving object and the target distance image detected by the moving object detecting part 10 (see FIG. 1) based on the assumption that the moving object is a human being. In this embodiment, the head region setting part 20 includes a head searching region setting part 21, a histogram generating part 22, a vertical range setting part 23, and a horizontal range setting part 24.

The head searching region setting part 21 sets a predetermined region as a region for searching the head of a human being (head searching region) based on a pixel position of an upper part of the counter.

Figure 18:
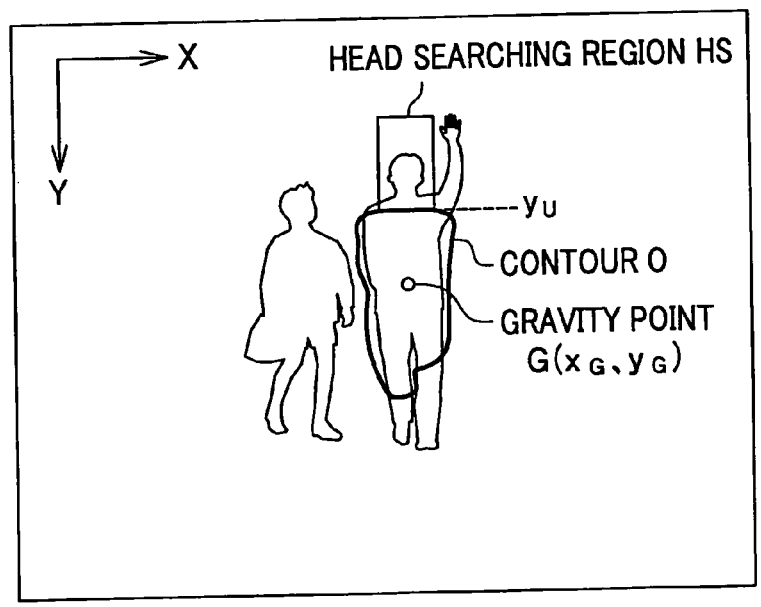
FIG. 18 is an illustration for an example of setting a head searching region on the target distance image.

In the head searching region setting part 21, it is assumed that, as shown in, for example, FIG. 18, coordinates of a gravity point G of the contour O are $(x_G, y_G)$, and a Y coordinate of the uppermost part at the X coordinate of the gravity point G is $y_U$. The region in the vertical direction of the head searching region HS is set such that a lower limit is lower than $y_u$ or a predetermined distance (for example, 0.2 m) lower than $y_u$, and an upper limit is set to a position corresponding to a specific size (for example, 2 m). Further the position of the upper end $y_T$ in the target distance images shown in FIG. 16B or 16D can be used as the upper limit.

A lower limit of the head searching region depends on an accuracy of the contour. For example, in a case that the contour can be accurately extracted up to the head, the lower limit is a predetermined distance (for example, 0.2 m) lower than the Y coordinate of the uppermost end of the contour O at the X coordinate of the gravity point G. In a case that the head of the human being cannot be extracted as a contour, the lower limit is the Y coordinate of the uppermost end of the contour O at the X coordinate of the gravity point G. If an accuracy of the contour is unstable, it is preferable that the lower limit is a predetermined distance lower than the Y coordinate of the upper end of the contour O.

Further, a region in the horizontal direction of the head searching region HS is set as a range of (±)0.2 m to the right and the left from the Y coordinate of the gravity point G.

The head searching region HS set by the head searching region setting part 21 is supplied to the histogram generating part 22.

The histogram generating part 22 counts, in the target distance image TD, the pixels located in the horizontal direction at each vertical coordinate (coordinate section) within the head searching region set by the head searching region setting part 21 to obtain the number of pixels of each vertical coordinate to generate the histogram. In the embodiment, the histogram generating part 22 arranges the horizontally counted number of pixels in the vertical direction. In the histogram, it can be regarded that the human being is located at the coordinate in the vertical direction in which the pixels are counted.

Further, preferably, the histogram generating part 22 smoothes the generated histogram similarly to the histogram generating part 16a described in FIG. 2.

More specifically, assuming that the number of the pixels at the target coordinate y in the histogram is Sy, Sy' is the number of pixels at the coordinate y of the histogram after smoothing, and y0 is a positive constant, the smoothing is performed by the following Eq. (15). Here, f(n) is a function of n, however, it may be a constant $$S'_y = \sum_{n=y-y_0}^{y-1} \frac{S_n}{f(n)} + S_y + \sum_{n=y+1}^{y+y_0} \frac{S_n}{f(n)} \tag{15}$$

The vertical range setting part 23 sets a range in the vertical direction of the head region on the basis of the histogram (the number of pixels in the horizontal direction) generated by the histogram generating part 22. The vertical range setting part 23 determines a coordinate of an uppermost point among veridical coordinates having the number of pixels in the horizontal direction greater than a predetermined threshold as a base, a coordinate a predetermine length (for example 0.1 m) higher than the base as the upper end, and a coordinate a predetermined length (for example, 0.5 m) lower than the upper end as the lower end of the head region.

The horizontal range setting part 24 sets a range of the head region in the horizontal direction. In the embodiment, the horizontal range setting part 24 determines a range of a predetermined length (for example, 0.5 m) from the X coordinate of the gravity point G of the contour O (see FIG. 18) as the range in the horizontal direction of the head region.

Here, with reference to FIG. 19 (occasionally FIG. 3) will be described a process of setting the head region using the head searching region. FIGS. 19A and 19B illustrate the process of setting the head region in the head searching region.

Figure 19A:
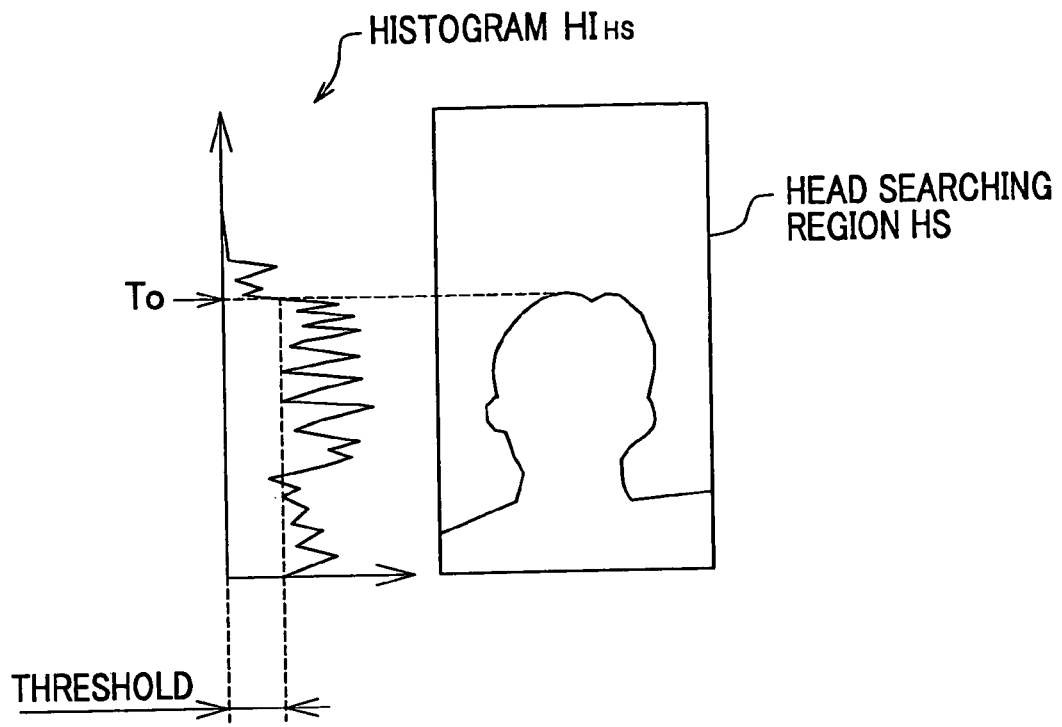
FIGS. 19A and 19B are illustrations for a process of a head region in the head searching region.
Figure 19B:
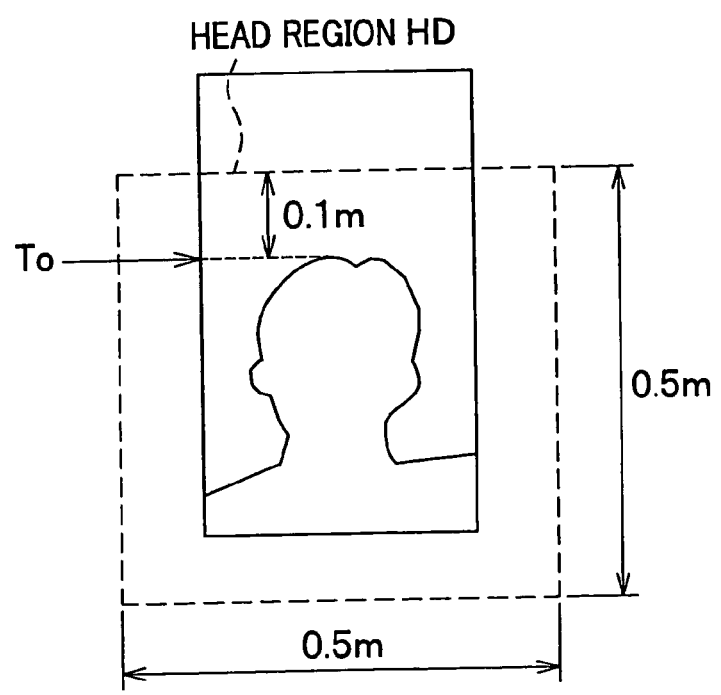

First, the histogram generating part 22 counts the pixels in the head searching region HS in the horizontal direction to generate, as shown in FIG. 19A, a histogram $HI_{HS}$. Next, the vertical range setting part 23 determines a coordinate of an uppermost point of the pixels counted in the horizontal direction as an upper end of the head. Here, in consideration of the noise, an upper end of the head is determined as the uppermost point To of the coordinates in the vertical direction in which the number of pixels exceed the predetermined threshold.

Next, the vertical range setting part 23 determines a coordinate a predetermined length (for example 0.1 m) higher than the uppermost point To as the upper end of the head region HD and a coordinate 0.5 m lower than the upper end as the lower end of the head region HD.

Further, the horizontal range setting part 24 determines a range 0.5 m around the X coordinate of the gravity point of the contour as a range in the horizontal direction of the head region HD.

The head region HD (position information of the head region) set as mentioned above is supplied to the human being determining part 30 (see FIG. 1).

<Human Being Determining Part 30>

Figure 4:
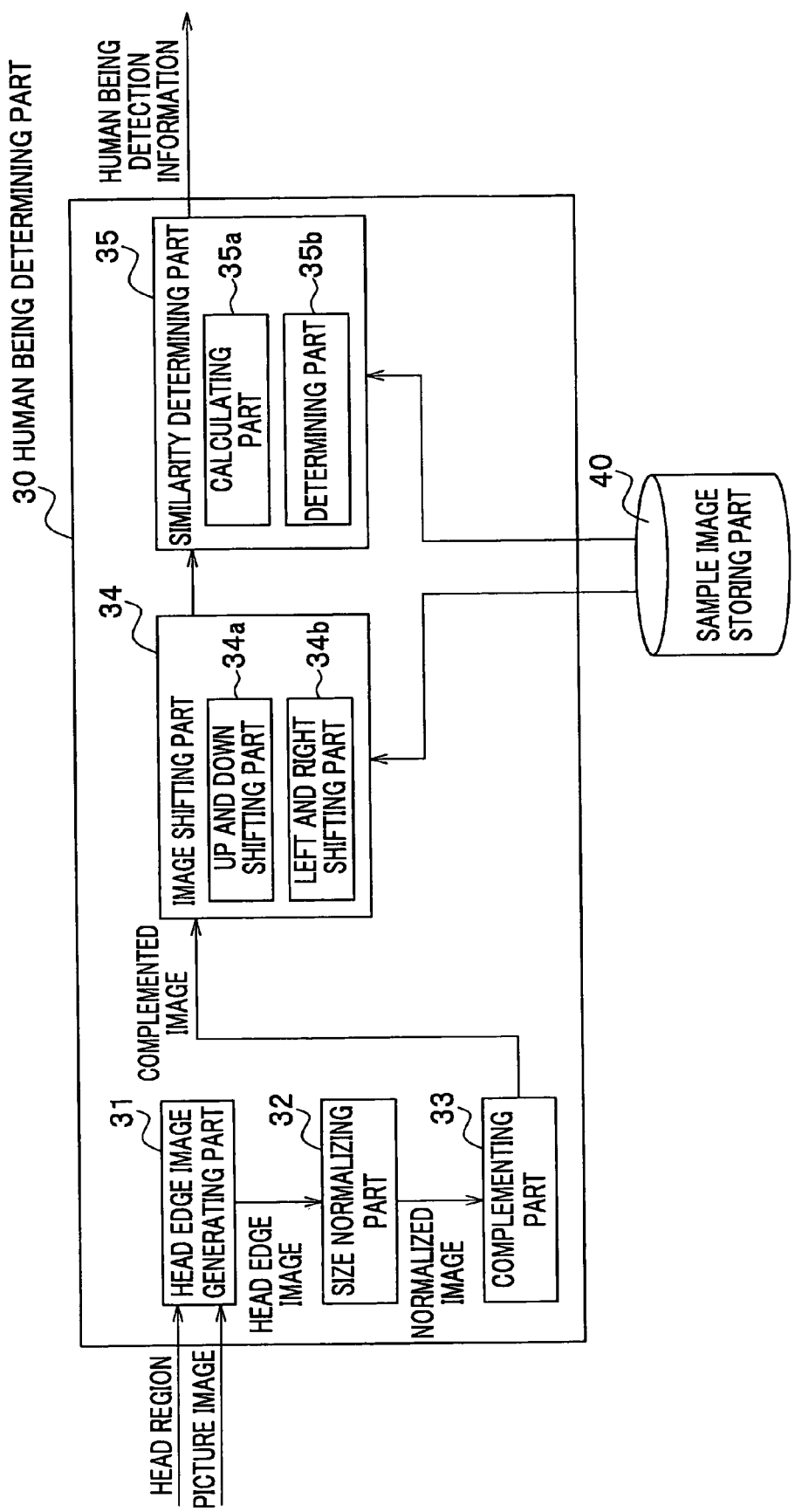
FIG. 4 is a block diagram of a human being determining part shown in FIG. 1.

Next with reference to FIG. 4 will be described a configuration of the human being setting part 30. FIG. 4 is a block diagram of the human being determining part 30 included in the human being detection apparatus 1 according to the present invention. As shown in FIG. 4, the human being determining part 30 determines whether the head region set by the head region setting part 20 is a region of the head of a human being in the picture image shot by the cameras 2 (see FIG. 1). In the embodiment, the human being determining part 30 includes a head edge image generating part 31, a size normalizing part 32, a complementing part 33, an image shifting part 34, and a similarity determining part 35.

The head edge image generating part 31 generates an edge image (head edge image) corresponding to the head region set by the head region setting part 20. In the embodiment, the head edge image generating part 31 extracts edges with the Sobel operator or the like from the picture image shot by the cameras 2 (see FIG. 1) at the head region set by the head region setting part 20 and binarizes the extracted edges with a predetermined threshold to generate the head edge image. For example, it is assumed that a value of a pixel showing an edge is "1" and those of the other pixels are "0".

Further because the edge image generating part 13 (see FIG. 2) generates the whole of the picture image, the head edge image generating part 31 may cut out the head region from the edge image and binarize the cut out region to generate the head edge image.

The size normalizing part 32 generates a normalized image by converting the head edge image generated by the head edge image generating part 31 to have a predetermined size. The predetermined size is identical with a size of the sample image stored in the sample image storing part 40.

The complementing part 33 fills gaps (non-edge parts) in the image in the normalized image generated by the size normalizing part 32. The complementing part 33 performs an enlarging process and a reducing process for a pixel region of the normalized image a plurality of times, respectively, to generate a complemented image in which the gaps in the image are filled.

For example, to enlarge the pixel region having the pixel value of "1", when a pixel at a processing target position in the enlargement-source image has a pixel value of "1" and/or eight neighbor pixels (or four neighboring pixels) neighboring the pixel at the processing target position have the pixel value of "1", a pixel value of a pixel at the processing target position in the enlarged image is made to have the pixel value of "1". Then, images are successively generated in which the pixel region having the value of "1" is enlarged from the normalized image of an enlargement source image.

Further, to reduce the pixel region having the pixel value of "0", when a pixel at a processing target position in the reduction-source image has a pixel value of "0" and/or eight neighboring pixels (or four neighboring pixels) neighboring the pixel at the processing target position have the pixel value of "0", a pixel value of a pixel at the processing target position in the reduced image is made to have a pixel value of "0". Then, images are successively generated in which the pixel region having the value of "0" is reduced from the image enlarged by the enlarging process as a reduction-source image to generate the complemented image.

With reference to FIG. 20 (occasionally FIG. 4), will be described more specifically a process of filling the gaps in the normalized image in the complementing part 33. FIGS. 20A to 20G show contents of images at respective stages in a case that the enlarging and reducing process is performed for the normalized image a plurality of times. FIGS. 20A to 20G show an example in which the complementing part 33 performs the enlarging process and the reducing process for the normalizing image three times, respectively. In the embodiment, the pixel value of the edge is assumed as "1 (highlight)", and that of other parts is assumed as "0 (shadow)."

FIG. 20A shows an original image of the normalized image generated by the size normalizing part 32. The complementing part 33 generates the images shown in FIGS. 20A to 20D by performing the enlargement process three times. Then a region having the pixel value of "1 (highlight)" is successively enlarged from the image shown in FIG. 20A, so that the regions having the pixel value of "1" are connected in FIG. 20D. In this stage the region having the pixel value of "1" is larger than the head region shown in FIG. 20A in accordance with an enlargement ratio.

Then, the complementing part 33 generates the image having a size identical with that of the head region shown in FIG. 20A by performing the reducing process the number of times, the number being identical with the number of times of the enlarging process (here, three times). More specifically, the complementing part 33 generates the images by performing the reducing process three times as shown in from FIG. 20D to 20G. As above, the region having the pixel value of "1" is successively reduced from FIG. 20D. Thus, the region having the pixel value of "1" in the image in FIG. 20G becomes the same size as the head region of the image shown in FIG. 20A.

Thus the complementing part 33 generates an image in which an inside of the head region in the normalized image is filled with the pixels having the same pixel value.

In the embodiment, the number of times of the enlarging process and the reducing process is three times in the above description. However, the number of times is not limited to this. Further, without limiting the number of times of the enlarging processes and the reducing process, it may be done to perform the enlarging process until any isolated pixel having the pixel value of "0 (shadow)" disappears, and the reducing process is performed the number of times, the number being identical with the number of times of the enlarging process.

Returning to FIG. 4, will be further described the configuration of the human being determining part 30.

The image shifting part 34 generates an image in which a position of the head of the complemented image of which gaps are filled by the complementing part 33 is adjusted to the position of the head in the sample image stored in the sample image storing part 40. In this embodiment, the image shifting part 34 includes an up and down shifting part 34a and a left and right shifting part 34b.

The up and down sifting part 34a adjusts the position of the head of the complemented image in an up and down direction by shifting the complemented image up and down direction. More specifically, the gravity point in the up and down direction of the complemented image is shifted so as to be adjusted to the gravity point in the up and down direction of the sample image.

The left and right shifting part 34b adjusts the position of the head in the complemented image to the head in the sample image by shifting the complemented image in the left and right direction. More specifically, the complicated image is shifted such that the position of the gravity point of the complemented image is adjusted to the position of the gravity point in the left and right direction.

As above, the image shifting part 34 shifts the complemented image in the up and down direction and the left and right direction to adjust the position of the head in the complemented image to the position of the head in the sample image, so that an accuracy of similarity obtained in the similarity determining part 35 mentioned later can be increased.

The similarity determining part 35 determines whether a shot moving object is a human being on the basis of the similarity between the complemented image and the sample image. In this embodiment, the similarity determining part 35 includes a similarity calculating part 35a and a determining part 35b.

The similarity calculating part 35a calculates the similarity indicating a degree of similarity between the images in the complemented image and the sample image. In the embodiment, the similarity calculating part 35a calculates the similarity R indicating the degree of similarity between images by Eq. (16) from the complemented image in which the position of the head is shifted by the image shifting part 34 and from a plurality of sample images stored in the sample image storing part 40.

$$R = 1 - d/S^2 \qquad (16)$$

In the equation, d is SAD (Sum of Absolute Difference), and S is a size of the sample image. As indicated by Eq. (16), the similarity calculating part 35a calculates the similarity by converting a value of the SAD of the sample image into that of a unit pixel. Further, the similarity R is a value equal to or greater than "0" and equal to or smaller than "1", wherein a similarity of "1" indicates the most similar status. This eliminates the necessity of changing a threshold for the similarity in the determining part 35b mentioned later even if a size of the sample image is changed.

The "d" (SAD) in Eq. (16) is calculated by Eq. (17).

$$d = \sum_{j=0}^{N-1} \sum_{i=0}^{M-1} |I(i, j) - T(i, j)| \quad (17)$$

In Eq. (17), I(i, j) is a pixel value of the complemented image, and T(i, j) is a pixel value of the sample image. The similarity R calculated as mentioned above is supplied to the determining part 35b.

In the embodiment, the similarity calculating part 35a calculates the similarity by the Eq. (16). However, a method of calculating the similarity is not limited to this. For example, S S D (Sum of the Squared Differences) may be used in place of "d" (SAD).

The determining part 35b determines whether the region set as the head region on the basis of the similarity is actually the head region of a human being. The determining part 35b determines that the subject region is the head region of a human being when the similarity R calculated by the similarity calculating part 35a is greater than a predetermined threshold to output information indicating that a human being is detected (human being detection information). The information may include a position of the human being (for example, the head region, a position of the gravity point thereof, a distance, or the like).

Further, the determining part 35b may determine a human being in a plurality of picture images in accordance with an average value of similarities in a predetermined number of frames. This provides continued detection of a human being even if a moving object cannot be temporarily determined to be a human being due to noise or the like.

The human being detection apparatus 1 is configured as mentioned above to allow determination of the head region from a picture image shot by the camera 2 and judgment whether the head shot in the region is the head of a human being, with a high accuracy in detecting a human being. Further, because the head region has a size according to the distance, the human being detection apparatus 1 allows a human being at any distance to be detected as a detection target by normalizing the image of the head region to have a size of the sample image.

With reference to FIGS. 21A to 21E (occasionally FIG. 4), will be described a detection result of the human being in the human being detection apparatus 1. FIGS. 21A to 21E are illustrations for describing the detection result when a human being is present in the picture image. These show four detection results in which FIGS. 21A shows original images including a human being in the picture images. FIGS. 21B shows normalized images derived by the size normalizing part 32 normalizing the head edge images generated by head edge image generating part 31. FIG. 21C shows the complemented images in which the gaps in the normalized images are filled by the complementing part 33. FIG. 21D shows similarities. FIG. 21E shows distances. The drawings arranged under each original image show the results from the original image.

As shown in FIG. 21B, the gaps are complemented after normalized to have a predetermined size (in this embodiment, 32×32 pixels), which allows comparison between the sample image shown in FIG. 19 and itself.

FIG. 21D shows similarities between the complemented image and the sample image, and FIG. 21E shows distances to the human beings. As above, the human being detection apparatus 1 can detect the human being at a given distance.

In FIG. 21E, when the distance is greater than 3.5 m (FIG. 21D), the similarity decreases (under 0.85). Then, for example, the threshold for determining the human target distance image being in the determining part 35b is determined as 0.85 to accurately detect the human being.

Further, to increase the detection accuracy of the human being, a distance at which the human being is detected may be determined within a predetermined range. For example, a detection range of the moving object is within 3.5 m. This operation can be provided by the target distance setting part 14 in the moving object detecting part 10 shown in FIG. 2 not supplying the target distance to the target distance image generating part 15 when the target distance to the moving object exceeds the detection range. The detection range is previously determined in accordance with a measured accuracy in determining the human being by the human being determining part 30.

As mentioned above, the configuration of the human being detection apparatus 1 has been described as an embodiment. The human being detection apparatus 1 can be provided by a general computer which is operated by a human being detection program for causing the computer as the respective parts mentioned above.

In the embodiment, the distance information generating part 11 of the human being detection apparatus 1 generates the distance image on the basis of the picture image shot by the two cameras 2. However, the distance image may be generated with three or more cameras. For example, nine careers arranged in a matrix with three row and three lines are provided in which the camera arranged at the center of the matrix is determined as a reference camera. The distance image is generated by the parallaxes between the reference camera and the other cameras to provide a more accurate distance measurement of the moving object.

[Operation of Human Being Detection Apparatus]

Figure 5:
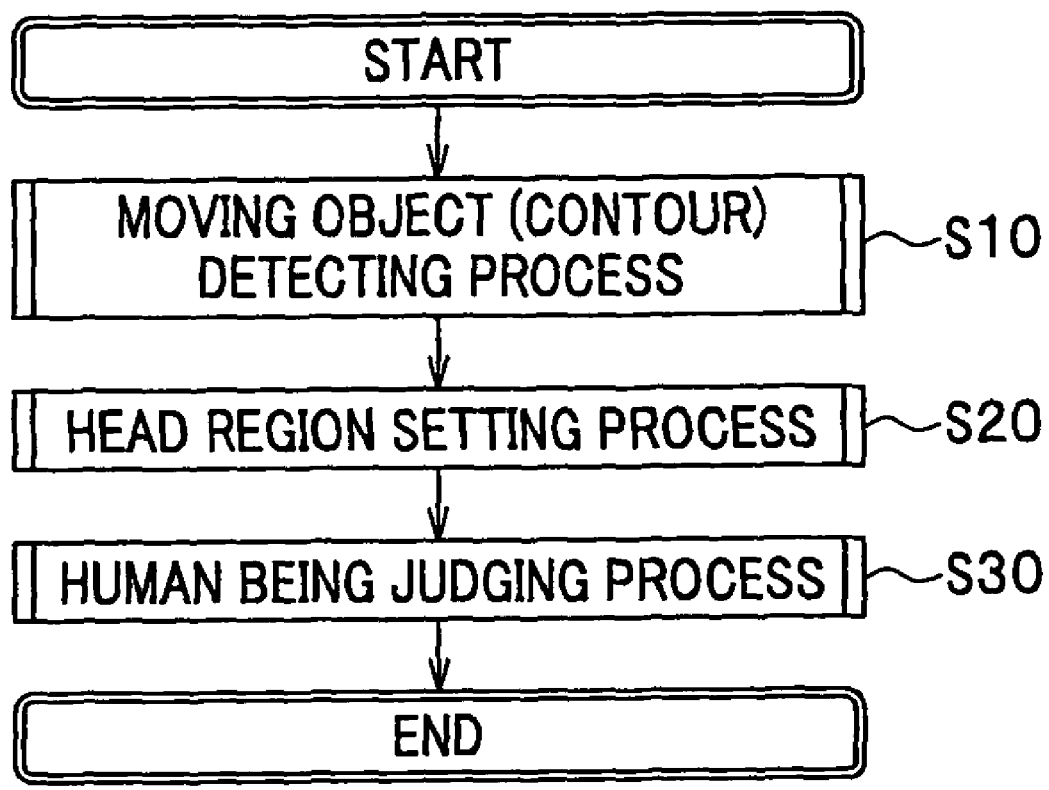
FIG. 5 shows a flowchart of a general operation of the human being detection apparatus according to the embodiment.

With reference to FIG. 5 (occasionally FIG. 1) will be described an operation of the human being detection apparatus 1 . FIG. 5 shows a flowchart of a general operation of the human being detection apparatus 1 according to the present invention.

First, the human being detection apparatus 1 detects a moving object showing a motion from the picture images shot by a plurality of the cameras 2 by the moving object detecting part 10 (a step S10: moving object detecting process). In the step S10, a contour of the moving object is extracted from the picture image, and the target distance image, including pixels having pixel values corresponding to the distance at which the moving object is located, is generated.

Next, the human being detection apparatus 1 sets the head region with the head region setting part 20 under an assumption that the moving object extracted in the step S10 is regarded as a human being (a step S20: a head region setting process). In the step S20, the head region when it is assumed that the moving object is a human being is set on the basis of the pixel distribution of the target distance image within the region predetermined based on the pixel positions of the upper part of the contour.

Next, the human being detection apparatus 1 determines whether the head shot within the head region set in the step S20 by the human being determining part 30 is a head of a human being, to detect the human being (a step S30: human being determining process).

Hereinafter, will be described in details operations of the moving object (contour) detection process in the step S10, the head region setting process, and the human being determining process in the step S30.

<Moving Object (Contour) Detecting Process>

Figure 6:
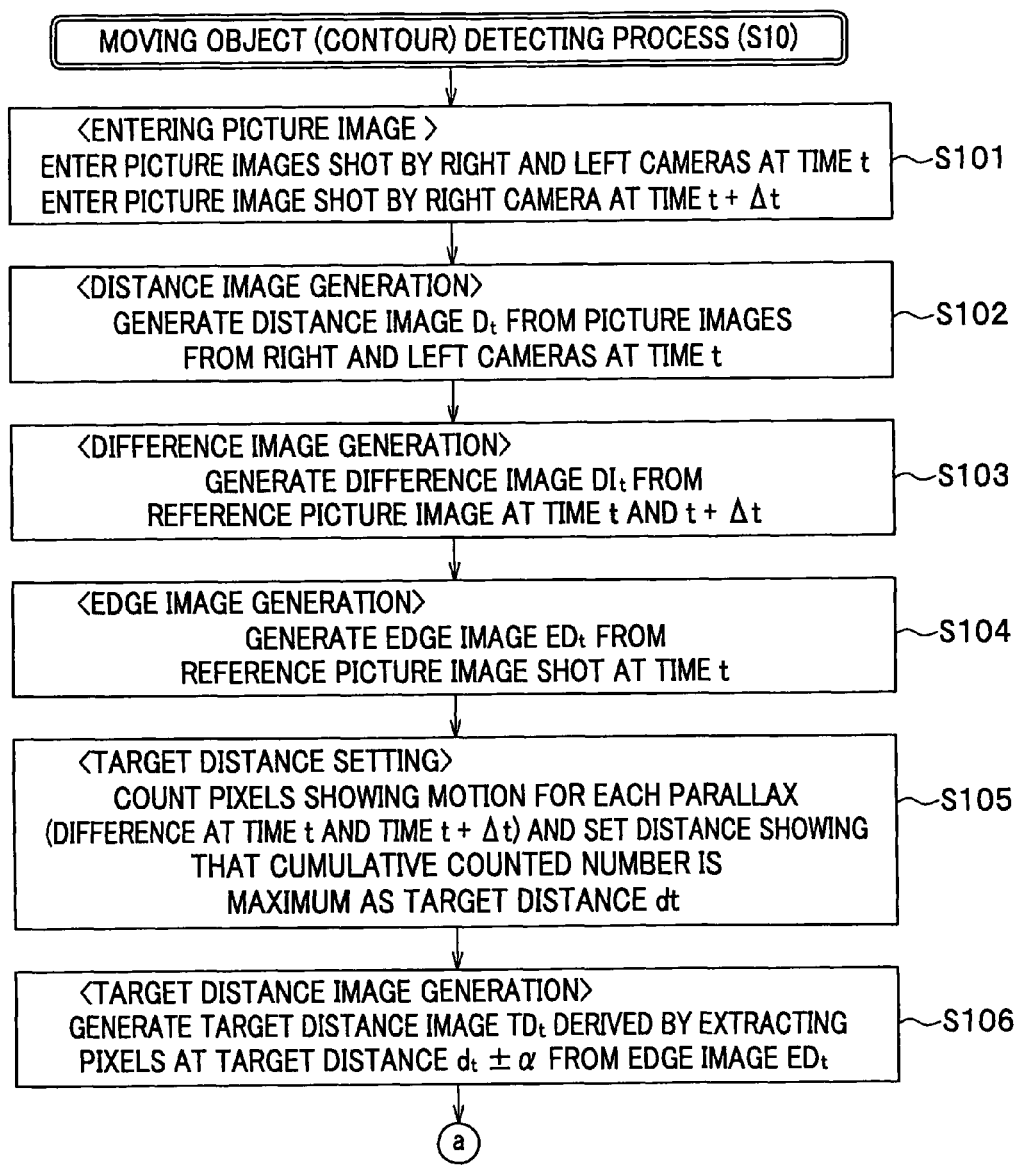
FIG. 6 shows a flowchart of a moving object (contour) detecting process (of a former part) shown in FIG. 5.
Figure 7:
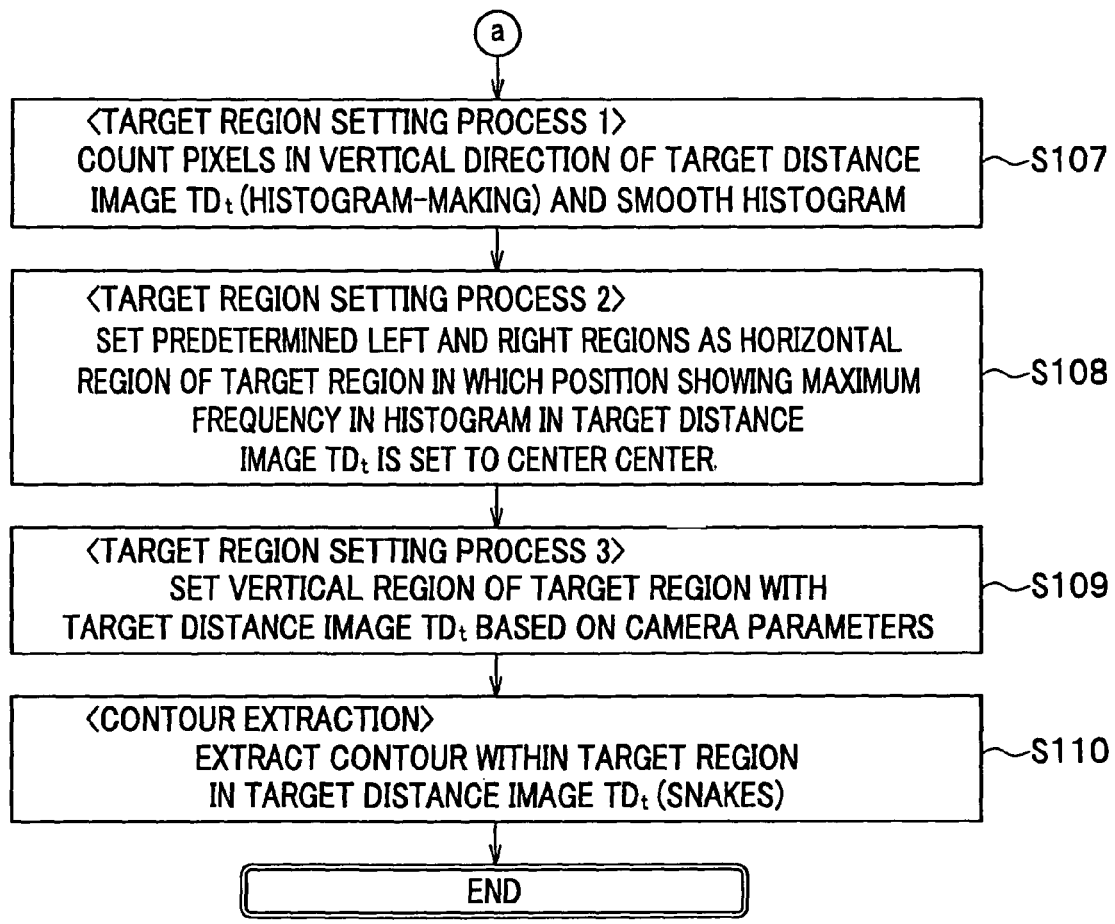
FIG. 7 shows a flowchart of the moving object (contour) detecting process (of a latter part) shown in FIG. 5.

First, with reference to FIGS. 6 and 7 (occasionally FIG. 2) will be described an operation of the moving object (contour) detecting process described in the step S10 in FIG. 5. FIGS. 6 and 7 show flowcharts showing the operation of the moving object (contour) detecting process in the moving object detecting part 10.

Picture Image Entering Step

First, the moving object detecting part 10 sequentially enters the picture images from the two cameras 2 synchronously therein (a step S101). In the embodiment, a moving object is extracted on the basis of the picture images entered from the right camera 2a (the reference camera) at a time t and from the left camera 2b at the time t and the picture images entered from the right camera 2a (the reference camera) and the left camera 2b at a time t+Δt. In addition, the distance images $D_{t-1}$ and $D_{t-2}$, and the target distance image $TD_{t-2}$ and $TD_{t-1}$ are generated in the stage at a time t-2 and a time t-1, respectively.

Distance Image (Distance Information) Generating Step

Next, the moving object detecting part 10 generates from the distance image generating part 11 a distance image $D_t$ in which are embedded parallaxes (distances) to the shot target including the moving object obtained from two picture images supplied from the right camera 2a (reference camera) and the left camera 2b at the time t (a step S102).

Difference Image (Motion Information) Generating Step

Further, the moving object detecting part 10 obtains with the motion information generating part 12 a difference between the two picture images (reference picture images) shot at the time t and time t+Δt by the right camera (reference camera) 2a to generate a difference image $DI_t$ in which any pixel having a difference is set to have the pixel value of "1" and any pixel having no difference is set to have the pixel value of "0" (a step S103).

Edge Image Generating Step

Further, the moving object detecting part 10 generates with the edge image generating part 13 an edge image $ED_t$ from the picture image (reference picture image) shot with the right camera 2a (reference camera) at the time t (a step S104).

Target Distance Setting Step

Next, the moving object detecting part 10 counts the pixels showing motions for each parallax (distance) indicated by the distance image $D_t$ from the distance image $D_t$ and the difference image $DI_t$ (difference image at the time t and time t+Δt) generated with the target distance setting part 14 in the steps S102 and S103 and sets a distance showing that the counted number is maximum as the target distance dt which is a detection target in the distance image $D_t$ (a step S105).

Target Distance Image Generating Step

Next the moving object detecting part 10 generates a target distance image $TD_t$ derived by extracting the pixels at target distance $d_t \pm \alpha$ from the edge image $ED_t$ generated by the target distance image generating part 15 in the step S104 (a step S106).

The human being detection apparatus 1 can set a region in a depth direction where the moving object is located in the distance image $D_t$ at the time t.

Target Region Setting Process

Next, the moving object detecting part 10 counts the pixels in the vertical direction (longitudinal direction) of the target distance image $TD_t$ generated by the step S106 with the histogram generating part 16a in the target region setting part 16 (a step S107). Further, in the step S107, it is preferable to smooth the histogram.

Next, the moving object detecting part 10 sets predetermined left and right regions as a horizontal range of the target region in which a position x1 showing a maximum frequency in the histogram in the target distance image $TD_t$ at the time t is centered, using the horizontal range setting part 16b in the target region setting part 16 (a step S108). In the embodiment, to detect a human being, is set a motion vector connecting positions at which histograms are greatest between a target distance image TD t-2 at a time t-2 and a target distance image TD t-1 at a time t-1. If an angle between the motion vector and the view direction of the cameras 2 is less than 45°, a center position x1±(0.5~0.6) m is determined as a horizontal range for detecting the human being. If the angle between the motion vector and the view direction of the cameras 2 is equal to or greater than 45°, the center position x1±(0.2~0.3) m is determined as the horizontal range for detecting the human being.

Further, the moving object detecting part 10 causes the vertical range setting part 16c of the target region setting part 16 to set a range of the target region in vertical (up and down) direction with the target distance image $TD_t$ on the basis of camera parameters such as a tilt angle, and a height from a floor (installing plane) (a step S109).

For example, a position of the floor (a lower end of the target region) in the image in the target distance image is obtained on the basis of the tilt angle and the height of the cameras 2. Next, the number of pixels from the floor in the target distance image within the target region is obtained by converting a region up to 2 m above the floor into the number of pixels on the basis of an angle of view and the distance to the moving object. This provides the upper end of the target region in the target distance image. A distance of 2 m is only an example, and thus may be any length (height).

Contour Extracting Step

Further, the moving object detecting part 10 causes the contour extracting part 17 to extract a contour within the target region set in the steps S108 and S109 in the target distance image $TD_t$ generated in the step S106 (a step S110). For example, the contour is extracted by using the dynamic contour model (SNAKES) within the target region.

The operations mentioned above provide detection of the moving object.

<Head Region Setting Process>

Figure 8:
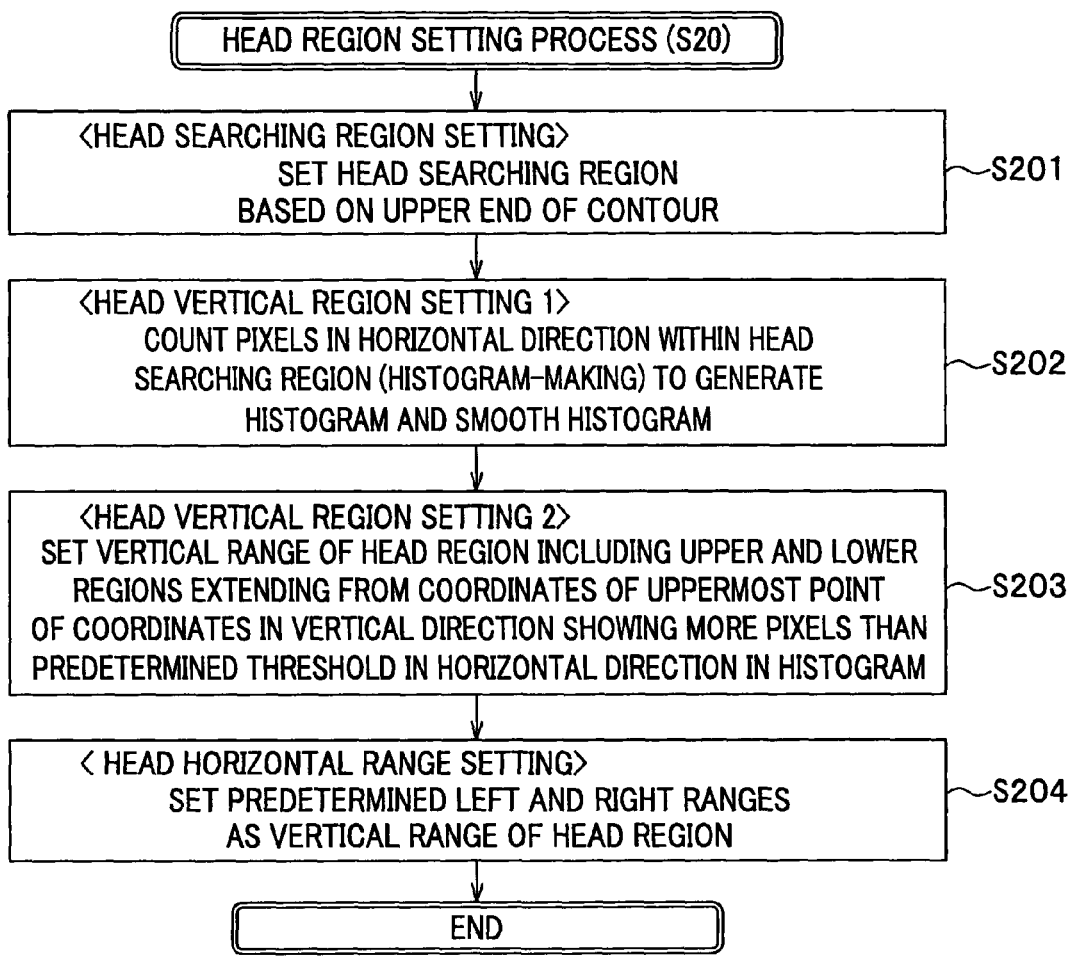
FIG. 8 shows a flowchart of a head region setting process shown in FIG. 5.

Next, with reference to FIG. 8 (occasionally, FIG. 3) will be described an operation of the head region setting process described with reference to the step S20 in FIG. 5. FIG. 8 is a flowchart showing the operation of the head region setting process in the head region setting part 20.

Head Searching Region Setting Step

First, the head region setting part 20 causes the head searching region setting part 21 to set a region having a predetermined range from the pixel position of an upper part (upper end) of the contour as a region (head searching region) for searching a head of the human being (a step S201). Here, the head part searching region setting part 21 sets the region of the head searching region in the vertical direction on the basis of a position (x, y) determined such that an X coordinate of a gravity point of the contour is x, and a Y coordinate of the upper end of the contour at the X coordinate x is y. For example, a lower limit of the head searching region is set to be a predetermined distance (for example, 0.2 m) below y, and an upper limit is set to be a position corresponding to a certain size (for example, 2 m).

Head Vertical Range Setting Step

Next the head region setting part 20 causes the histogram generating part 22 to count the pixels in the horizontal direction in the target distance image for each coordinate in the vertical direction within the range of the head searching region set by the head searching region setting part 21 to generate the histogram (a step S202). Further, in the step S202, it is preferable to smooth the histogram.

Next, the head region setting part 20 sets a vertical range of the head region on the basis of coordinates of the uppermost point of coordinates in the vertical direction showing more pixels than a predetermined threshold in the horizontal direction in the histogram generated in the step S202 by the vertical range setting part 23 (a step S203). For example, the vertical range setting part 23 determines the coordinates of the uppermost point as a reference point, coordinates a certain length (for example, 0.1 m) above the reference point as the upper end of the head region, and coordinates a predetermined length (for example, 0.5 m) below the upper end as the lower end of the head region.

Head Horizontal Range Setting Process

Further, the head region setting part 20 causes the horizontal range setting part 24 to determine predetermined left and right ranges as a horizontal range of the head region in which an X coordinate of the gravity point of the contour is centered. More specifically, a certain length (for example, 0.5 m) is determined as the horizontal range of the head region in which the X coordinate of the gravity point is centered (a step S204).

The operation mentioned above specifies where the head region of the human being is located in the picture image supplied from the cameras 2 (see FIG. 1).

<Human Being Determining Process>

Figure 9:
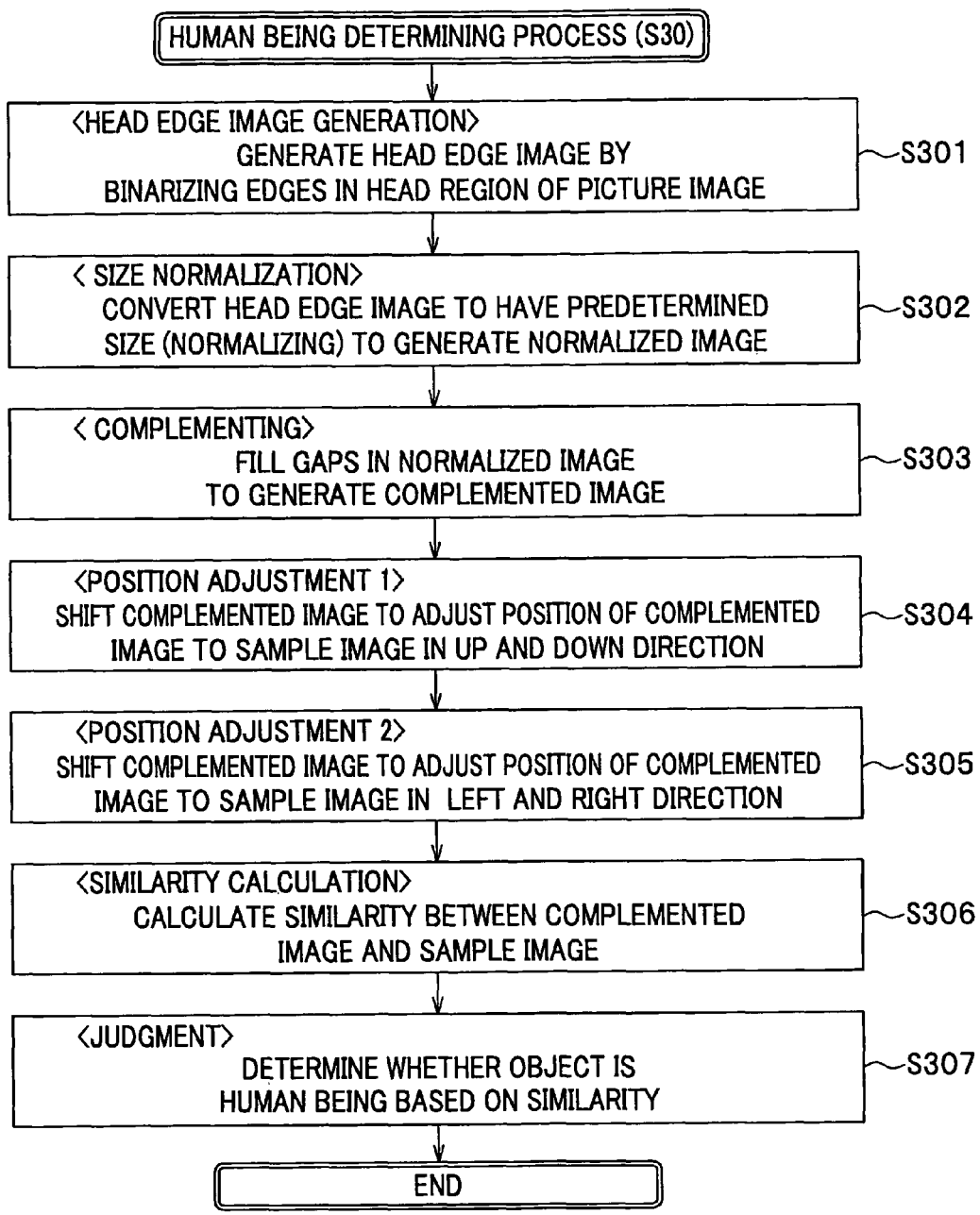
FIG. 9 shows a flowchart of a human being determining process shown in FIG. 5.

Next, with reference FIG. 9 (occasionally FIG. 4) will be described an operation of the human being determining process described with reference to the step S30 in FIG. 5. FIG. 9 is a flowchart indicating the operation of the human being determining process in the human being determining part.

Head Edge Image Generating Step

First, the human being determining part 30 causes the head edge image generating part 31 to extract edges in the head region of the picture image with the Sobel operator or the like to generate the head edge image by binarizing the edges with a predetermined threshold (a step S301). Further, the head edge image generating part 31 may cut out the head region from the edge image generated in the step S104 (see FIG. 6) to generate the head edge image by binarizing.

Size Normalizing Step

Next, the human being determining part 30 causes the size normalizing part 32 to convert the head edge image into an image having a predetermined size to generate the normalized image (a step S302). This normalizes the image (head edge image) of the head region generated with a given distance to have a predetermined size.

Complementing Step

The human being determining part 30 causes the complementing part 33 to perform the enlarging process and the reducing process a plurality of times, respectively, for the pixels of the head edge image to generate the complemented image in which the gaps in the image are filled (a step S303).

Image Shift Step

After that, the human being determining part 30 causes the up and down shifting part 34a of the image shifting part 34 to shift the complemented image so as to adjust the position of the gravity point of the complemented image to the position of the gravity point of the sample image in the up and down direction (a step S304). This makes the up and down position of the head in the complemented image approximately identical with the up and down position of the head in the sample image.

Further, the human being determining part 30 causes the left and right shifting part 34b to shift the complemented image so as to adjust a left and right position of the gravity point of the complemented image to a left and right position of the gravity point of the sample image (a step S305). This makes the left and right position of the head in the complemented image approximately identical with the left and right position of the head in the sample image.

Execution of the steps S304 and S305 makes the position of the head in the complemented image approximately identical with the head position of the sample image. Further, the steps S304 and S305 may be executed in reverse order.

Similarity Calculating Step

Next, the human being determining part 30 causes the similarity calculating part 35a of the similarity determining part 35 to calculate the similarity between respective images in the complemented image and the sample image (a step S306).

Determining Step

Next, the human being determining part 30 causes the determining part 35b of the similarity determining part 35 to compare the similarity calculated in the step S306 with a predetermined threshold and determine that the region is the head region of a human being when the similarity is greater than the predetermined threshold (a step S307).

The human being detection apparatus 1 according to the embodiment can detect the human being from the picture images supplied from the cameras 2 through the above-mentioned steps. In the embodiment, the human being is detected at a time t. However, the above-mentioned steps (steps from S10 to S30) are performed on the basis of the picture images successively supplied to continuously detect the human being by for example, a robot or the like including the human being detection apparatus 1.

According to the present invention, because it is determined whether the moving object is a human being, even under such a complicated circumstance as inside an office, the human being can be detected from the picture image. Further, according to the present invention, even if a motionless object is erroneously recognized as a moving object because the position adjustment of backgrounds between the frame images is incorrectly performed, the human being can be accurately detected because it can be determine whether the moving object is a human being.

The invention claimed is:

1. A human being detection apparatus for detecting a human being in a plurality of picture images including a moving object shot by a plurality of cameras, comprising:

a moving object detecting part that detects a target region of the moving object in the picture images and a target distance to the moving object from the camera as moving object information on the basis of parallaxes in picture images and a difference between picture images sequentially entered;

a head region setting part that sets a head region as having a predetermined size corresponding to the target distance in the target region detected by the moving object detecting part when it is assumed that the moving object is the human being;

a sample image storing part for storing a sample image having a predetermined size corresponding to the head region of the human being; and a human being determining part that determines whether the moving object is the human being by converting the head region, set by the head region setting part, in the picture image into an image having the predetermined size and comparing the converted head region with the sample image to determine that the moving object is the human being.

2. The human being detection apparatus as claimed in claim 1, wherein the sample image is an image indicating a shape of the head region, and the human being determining part includes:

a head edge image generating part that generates a head edge image as an edge image corresponding to the head region set by the head region setting part;

a size normalizing part that converts the head edge image generated by the head edge image generating part into a normalized image having the predetermined size;

a complementing part that generates a complemented image in which gaps in the normalized image converted by the size normalizing part are filled; and a similarity determining part that determines that the moving object is the human being on the basis of a similarity between the complemented image and the sample image.

3. The human being detection apparatus as claimed in claim 2, wherein the complementing part fills gaps in the head edge image by enlarging and reducing for a region of the head edge image generated by the head edge image generating part a plurality of times, respectively.

4. The human being detection apparatus as claimed in claim 1, further comprising an image shifting part that adjusts a reference position of the complemented image to a predetermined reference position of the sample image.

5. The human being detection apparatus as claimed in claim 1, wherein the sample image storing part stores a plurality of sample images of a sample human being in which a direction of the sample human being varies from one of the sample image to another one of the sample images.

6. The human being detection apparatus as claimed in claim 1, wherein the moving object detecting part outputs the moving object information when the target distance is within a predetermined range which is previously determined in accordance with a measured accuracy in determining the human being by the human being determining part.

7. A method of detecting a human being included in a plurality of picture images including a moving object shot by a plurality of cameras, comprising the steps of:

detecting a target region of the moving object in the picture images and a target distance to the moving object from the camera as moving object information on the basis of parallaxes in picture images and a difference between picture images sequentially entered;

setting a head region as having a predetermined size corresponding to the target distance in the target region when it is assumed that the moving object is the human being;

generating a head edge image as an edge image corresponding to the head region;

converting the head edge image into a normalized image having the predetermined size;

generating a complemented image in which gaps in the normalized image converted by the size normalizing part are filled;

calculating a similarity between the complemented image and a sample image of the head region having the predetermined size previously stored in a sample image storage; and determining that the moving object is the human being on the basis of the similarity.

8. A human being detecting program embodied on a non-transitory computer-readable medium for causing a computer to operate, to detect a human being from a plurality of picture images shot by a plurality of cameras, to have functions of:

a moving object detecting part that detects a target region of the moving object in the picture images and a target distance to the moving object from the camera as moving object information on the basis of parallaxes in picture images and a difference between picture images sequentially entered;

a head region setting part that sets a head region as having a predetermined size corresponding to the target distance in the target region detected by the moving object detecting part when it is assumed that the moving object is the human being;

a sample image storing part for storing a sample image having a predetermined size corresponding to the head region of the human being; and a human being determining part that determines whether the moving object is the human being by converting the head region set by the head region setting part in the picture image into an image having the predetermined size and comparing the converted head region with the sample image to determine the moving object is the human being.

* * * * *